(12) United States Patent
Tanaka et al.

(10) Patent No.: US 10,430,287 B2
(45) Date of Patent: Oct. 1, 2019

(54) COMPUTER

(71) Applicant: Hitachi, Ltd., Tokyo (JP)

(72) Inventors: Tsuyoshi Tanaka, Tokyo (JP); Yuuya Isoda, Tokyo (JP); Atsushi Tomoda, Tokyo (JP); Tomohiro Hanai, Tokyo (JP); Hideo Aoki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 15/303,293

(22) PCT Filed: Apr. 23, 2014

(86) PCT No.: PCT/JP2014/061394
§ 371 (c)(1),
(2) Date: Oct. 11, 2016

(87) PCT Pub. No.: WO2015/162717
PCT Pub. Date: Oct. 29, 2015

(65) Prior Publication Data
US 2017/0039110 A1 Feb. 9, 2017

(51) Int. Cl.
*G06F 16/00* (2019.01)
*G06F 11/14* (2006.01)
(Continued)

(52) U.S. Cl.
CPC .......... *G06F 11/1458* (2013.01); *G06F 3/061* (2013.01); *G06F 3/0656* (2013.01);
(Continued)

(58) Field of Classification Search
CPC ............. G06F 11/1458; G06F 16/2379; G06F 16/2308; G06F 3/061; G06F 3/0656; G06F 3/0685; G06F 12/0875; G06F 2212/60
(Continued)

(56) References Cited

U.S. PATENT DOCUMENTS 5,986,980 A * 11/1999 Takeshita .............. G06F 3/0613
369/30.23
6,240,413 B1 5/2001 Learmont
(Continued)

FOREIGN PATENT DOCUMENTS

JP 2000-347909 A 12/2000
JP 2001-527242 A 12/2001

OTHER PUBLICATIONS

International Search Report of PCT/JP2014/061394 dated Aug. 19, 2014.
(Continued)

*Primary Examiner* — Hanh B Thai
(74) *Attorney, Agent, or Firm* — Mattingly & Malur, PC

(57) ABSTRACT

A computer for executing processing through use of a database, the computer comprising: a processor including a cache memory; and a non-volatile memory coupled to the processor, the non-volatile memory having the database constructed thereon. The computer comprises: a database management module configured to execute processing on the database; and a write processing module configured to write data stored in the cache memory into the database. The write processing module writes data that is operated in the transaction processing into the database among data stored in the cache memory, in a case of receiving a commit request for transaction processing that uses the database.

8 Claims, 18 Drawing Sheets

(51) Int. Cl.
*G06F 16/215* (2019.01)
*G06F 16/23* (2019.01)
*G06F 3/06* (2006.01)
*G06F 12/0875* (2016.01)

(52) U.S. Cl.
CPC ........ *G06F 3/0685* (2013.01); *G06F 12/0875* (2013.01); *G06F 16/215* (2019.01); *G06F 16/2308* (2019.01); *G06F 16/2379* (2019.01); *G06F 2212/60* (2013.01)

(58) Field of Classification Search
USPC ................................................ 707/684, 674
See application file for complete search history.

(56) References Cited

U.S. PATENT DOCUMENTS

| | | | |
|---|---|---|---|
| 7,356,650 B1 | 4/2008 | Englin et al. | |
| 8,335,771 B1* | 12/2012 | Natanzon | G06F 11/2069 707/684 |
| 8,990,166 B2* | 3/2015 | Thomsen | G06F 3/061 707/678 |
| 9,747,324 B2* | 8/2017 | Akiyama | G06F 16/27 |
| 2002/0087500 A1 | 7/2002 | Berkowitz et al. | |
| 2012/0054164 A1 | 3/2012 | Falkebo et al. | |
| 2013/0097369 A1 | 4/2013 | Talagala et al. | |
| 2013/0103650 A1* | 4/2013 | Natanzon | G06F 11/2069 707/684 |
| 2014/0297590 A1* | 10/2014 | Akiyama | G06F 16/27 707/625 |

OTHER PUBLICATIONS

Extended European Search Report received in corresponding European Application No. 14889792.9 dated Sep. 15, 2017.
Guy Harrison, "Yet Another Database Blog—Exadata Write-back cache and Free Buffer Waits", Nov. 22, 2013, URL: http://guyharrison.squarespace.com/blog/2013/11/22/exadata-write-back-cache-and-free-buffer-waits.html.

* cited by examiner

OBJECT MANAGEMENT TABLE
| O_ID | TYPE | OBJECT DEFINITION | START POINTER |
|---|---|---|---|
| 000 | Table | Column_Number=2, Column1=8Byte, Column2=255Bye | PT1 |
| ⋮ | ⋮ | ⋮ | ⋮ |
FIG. 5
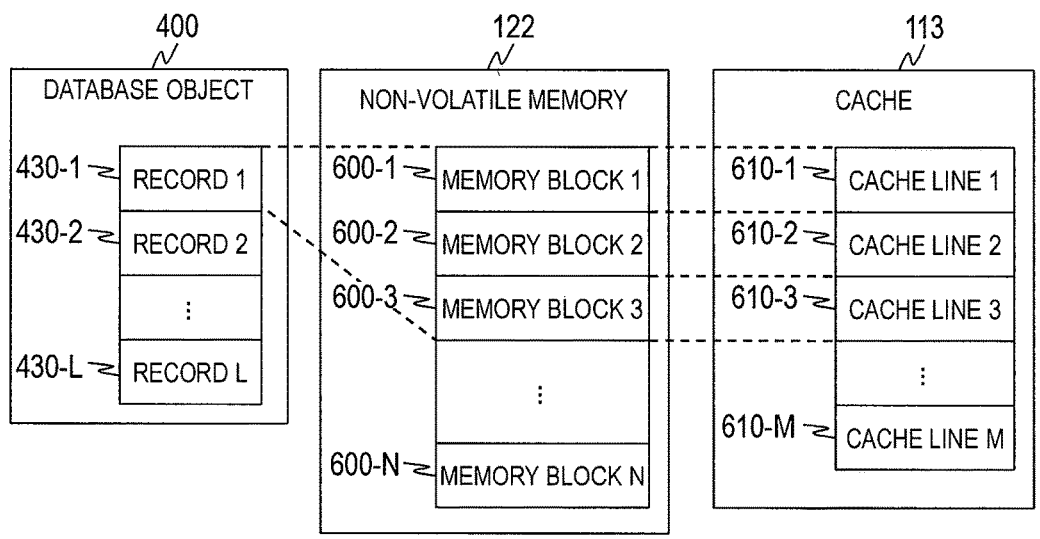
FIG. 6
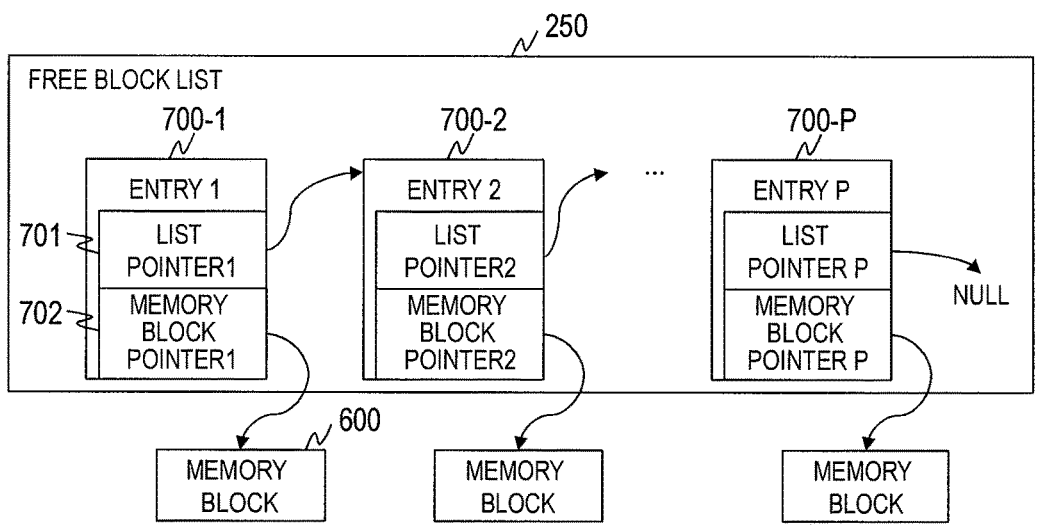
FIG. 7

```
Sync() {
   Chg_Record_CacheAddr();
   for (all cache line){
      BulkWtMM(linear address);
   }
}
```
1600

*FIG. 16A*

```
BulkWtMM() {
   flush (linear address)
}
```
1611

*FIG. 16B*

```
BulkWtMM() {
   mov register (linear address)
}
```
1612

*FIG. 16C*

COMPUTER

BACKGROUND OF THE INVENTION

This invention relates to management of consistency of data in a database system.

In recent years, the capacity of a fast-access non-volatile storage medium has been increasing, and its access speed has also been increasing. The non-volatile storage medium is predicted to be used as a main memory in the future.

Hitherto, a database has been constructed on a slow-access storage medium, e.g., a hard disk drive (HDD), in a system that uses a database for processing. Thus, the speed of access to the database is low, resulting in a failure to achieve high-speed processing.

In order to solve the above-mentioned problem, there is known a technology for temporarily storing data in a buffer on a volatile main memory and committing a processing result asynchronously with processing of using a database by a processing unit configured to execute the processing of using a database (e.g., refer to US 2013/0097369).

SUMMARY OF THE INVENTION

In a case where a database is constructed on a fast-access non-volatile storage medium, the processing result can be reflected in the database at high speeds. That is, the processing result is readily committed.

In transaction processing, a processor reads data into a cache memory included in the processor and executes processing through use of the read data to achieve high-speed processing. The processor writes the data stored in the cache memory into a non-volatile storage medium at a predetermined timing.

In a system that employs write-through caching, the processor writes the same data into a cache memory and a non-volatile storage medium at the same time. On the other hand, in a system that employs write-back caching, the processor writes data only into the cache memory. This write data is written into a main memory from the cache memory in an asynchronous manner. An ordinary processor employs write-back caching in many cases.

A program to be executed by a processor does not distinguish between writing of data into a cache memory and writing of data into a main memory, but specifies a logical address on a memory to execute processing of writing data. Data written by the processor into the cache memory is reflected in the main memory in the background through use of a hardware function on a system side, independently of the operation of the program described above.

In a system that employs write-back caching, there is a difference in time between writing of data into the cache memory and writing of data into the non-volatile storage medium. In addition, even the system that employs write-through caching has a small difference in time between writing of data into the cache memory and writing of data into the main memory. Thus, in a case where a failure occurs in transaction processing, only a part of data is committed, to thereby cause inconsistency of data.

In short, there is a problem in that, when a database is constructed on a non-volatile storage medium, data is committed at high speeds as described above, to thereby cause inconsistency of data.

The present invention can be appreciated by the description which follows in conjunction with the following figures, wherein: a computer for executing processing through use of a database, the computer comprising: a processor including a cache memory; and a non-volatile memory coupled to the processor, the non-volatile memory having the database constructed thereon. The computer comprises a database management module configured to execute processing on the database, and a write processing module configured to write data stored in the cache memory into the database. The write processing module writes data that is operated in the transaction processing into the database among data stored in the cache memory, in a case of receiving a commit request for transaction processing that uses the database.

According to one embodiment mode of this invention, it is possible to suppress the occurrence of the inconsistency of data by writing data stored in the cache memory into the database at the time of commit in transaction processing.

Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 5 is a table for showing an example of an object management table according to the first embodiment;

FIG. 6 is an explanatory diagram for illustrating an example of data arrangement in a main memory and a cache memory according to the first embodiment;

FIG. 7 is an explanatory diagram for illustrating an example of a free block list according to the first embodiment;

FIG. 16A, FIG. 16B, and FIG. 16C are each an explanatory diagram for illustrating an example of a program code to be used for the write processing of data to be stored into the cache memory according to the first embodiment;

DETAILED DESCRIPTION OF THE PREFERRED EMBODIMENTS

First Embodiment

Figure 1:
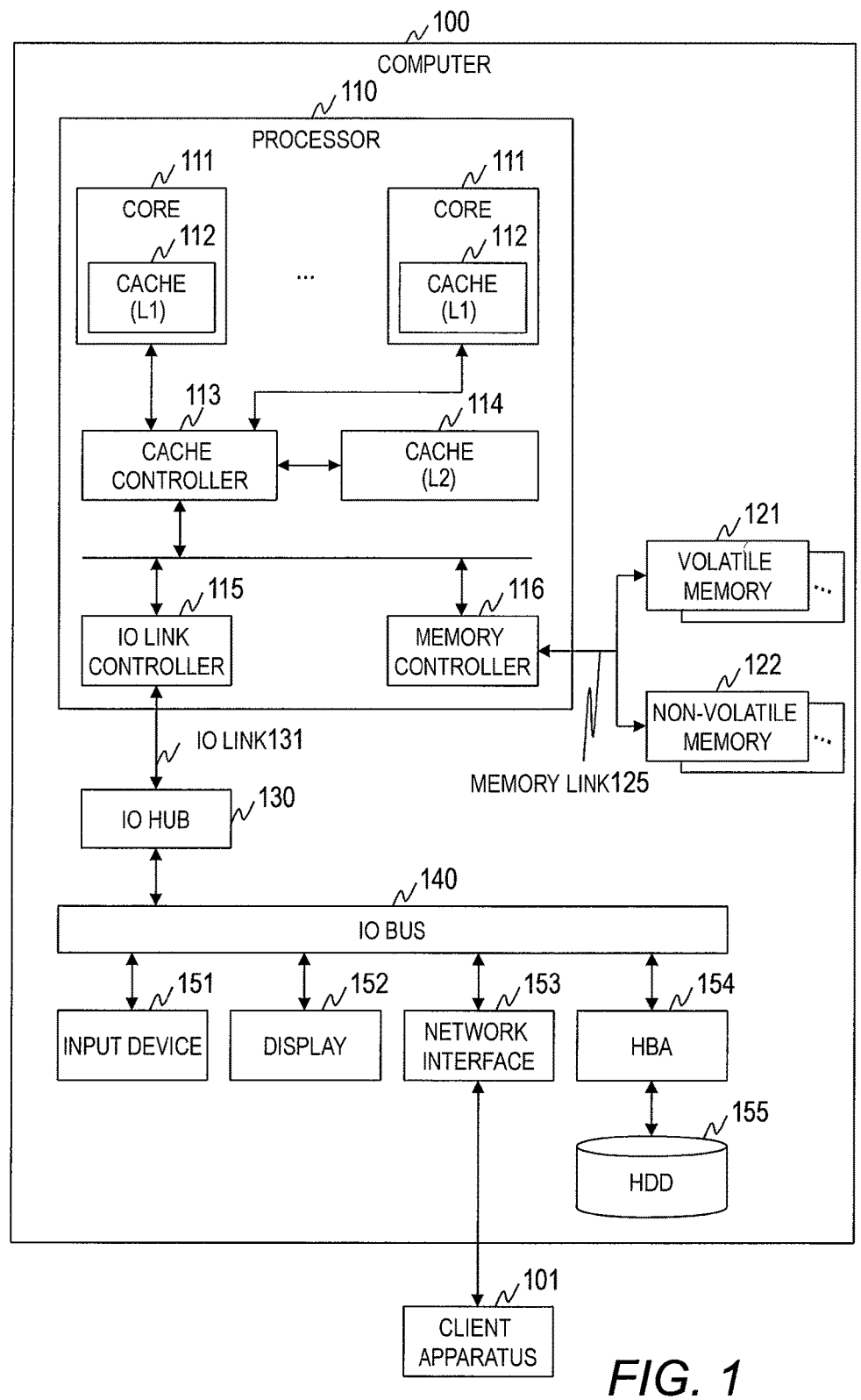
FIG. 1 is a block diagram for illustrating a configuration example of a computer system according to a first embodiment of this invention.

FIG. 1 is a block diagram for illustrating a configuration example of a computer system according to a first embodiment of this invention.

The computer system includes a computer 100 and a client apparatus 101. The computer 100 and the client apparatus 101 are coupled to each other via a network. The network may be of any type as long as the computer 100 and the client apparatus 101 can communicate to/from each other. For example, the type of the network may be any one of a WAN and a LAN, and the computer 100 and the client apparatus 101 may be coupled in a wireless or wired manner in the network. More than one computer 100 and client apparatus 101 may be provided.

The computer 100 is configured to execute predetermined processing through use of a database. The computer 100 includes a processor 110, a volatile memory 121, a non-volatile memory 122, an IO hub 130, an IO bus 140, an input device 151, a display 152, a network interface 153, an HBA 154, and an HDD 155. In the following description, the volatile memory 121 and the non-volatile memory 122 may collectively be referred to as "main memory" when those memories are not distinguished from each other.

The processor 110 and the volatile memory 121 are coupled to each other via a memory link 125, and the processor 110 and the non-volatile memory 122 are coupled to each other via the memory link 125 as well. The processor 110 and the JO hub 130 are coupled to each other via an JO link 131. The JO hub 130, the input device 151, the display 152, the network interface 153, and the HBA 154 are coupled to one another via the JO bus 140.

Further, the HDD 155 is coupled to the JO bus 140 via the HBA 154. Further, the computer 100 is coupled to the client apparatus 101 via the network interface 153.

The processor 110 is an arithmetic device configured to execute a program stored in the main memory. The function of the computer 100 is implemented by the processor 110 executing the program stored in the main memory. The processor 110 includes a plurality of cores 111, a cache controller 113, a cache 114, an JO link controller 115, and a memory controller 116.

The core 111 is an arithmetic unit configured to execute predetermined arithmetic operations, and includes a cache 112. The cache 112 and the cache 114 are cache memories configured to temporarily store data to be processed by the processor 110. In the following, the cache 112 and the cache 114 may collectively be referred to as "cache memory" when those caches are not distinguished from each other.

The cache controller 113 is configured to control data in the cache memory. The JO link controller 115 is configured to control JO devices such as the input device 151 and the network interface 153. The memory controller 116 is configured to control access to the main memory.

The volatile memory 121 and the non-volatile memory 122 are storage media configured to store programs to be executed by the processor 110 and information necessary for execution of those programs. A dynamic random access memory (DRAM) is given as an example of the volatile memory 121. Further, a phase change memory (PCM) or a resistance random access memory (ReRAM) is given as an example of the non-volatile memory 122.

A software configuration of the computer 100 is described later with reference to FIG. 2 and FIG. 3.

The input device 151 is a device configured to input various settings and instructions to the computer 100. A keyboard, a mouse, or a touch panel is given as an example of the input device 151. The display 152 is a device configured to display a state and processing result of the computer 100. The network interface 153 is an interface configured to couple to other devices via a network. The HBA 154 is an interface configured to couple to storage devices, e.g., the HDD 155. In this embodiment, the HBA 154 is coupled to the HDD 155, which is an internal component. However, the HBA 154 may be coupled to a storage system (not shown) placed outside.

The client apparatus 101 is a computer to be used by, for example, a user, which is configured to transmit various instructions to the computer 100 and receive processing results and other information from the computer 100. The client apparatus 101 includes a processor (not shown), a memory (not shown), and a network interface (not shown).

Figure 2:
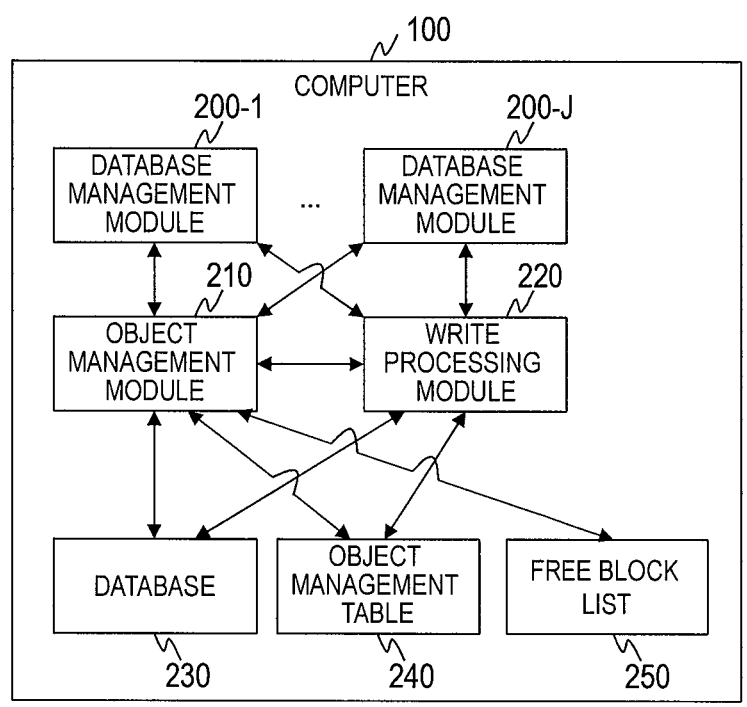
FIG. 2 is a block diagram for illustrating a software configuration of a computer according to the first embodiment.

FIG. 2 is a block diagram for illustrating a software configuration of the computer 100 according to the first embodiment. The arrows illustrated in FIG. 2 indicate an access relationship between functional modules and an access relationship between a functional module and information.

The computer 100 includes a plurality of database management modules 200, an object management module 210, a write processing module 220, a database 230, an object management table 240, and a free block list 250. The database management module 200, the object management module 210, and the write processing module 220 are implemented by the processor 110 executing programs stored in the main memory. In the following, when a description is given with a focus on a certain functional module, it means that the processor 110 is executing a program for implementing that functional module.

Figure 4:
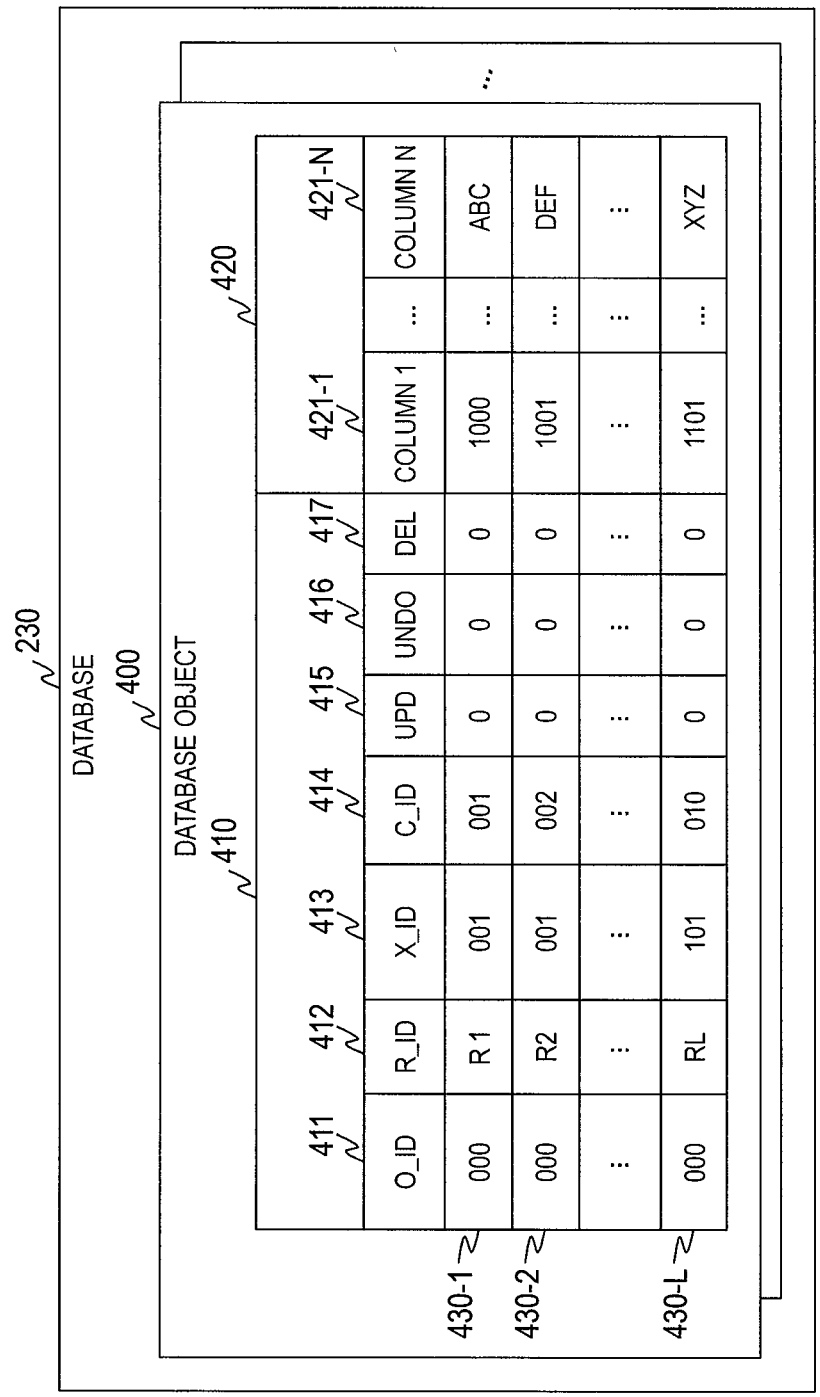
FIG. 4 is an explanatory diagram for illustrating a configuration example of a database according to the first embodiment.

The database 230 stores a plurality of database objects 400 illustrated in FIG. 4. Details of the database object 400 stored in the database 230 are described later with reference to FIG. 4. The object management table 240 stores information for managing the database object 400. Details of the object management table 240 are described later with reference to FIG. 5. The free block list 250 stores information for managing an available area of a memory space. Details of the free block list 250 are described later with reference to FIG. 7.

The database management module 200 is configured to execute various types of processing on the database 230. The database management module 200 has a buffer that stores, for example, an identifier of a record of the database object 400 to be processed. In this embodiment, the computer 100 has the database management module 200 for each client apparatus 101. However, this embodiment is not limited by the number of database management modules 200.

The object management module 210 is configured to manage the database object 400 stored in the database 230. The object management module 210 organizes processing requests received from the respective database management modules 200, and executes addition processing, update processing, deletion processing, or other processing on the database object 400 of the database 230 based on those processing requests.

In this embodiment, the object management module 210 controls data such that the data is written into an area having a certain logical address. This embodiment is applicable irrespective of whether the cache memory of the system employs write-through caching or write-back caching.

The write processing module 220 is configured to write data stored in the cache memory into the main memory in bulk at the time of commit in transaction processing.

The database management module 200, the object management module 210, and the write processing module 220 may be implemented as functions included in the operating system (OS) or as applications running on the OS.

Details of processing to be executed by the database management module 200, the object management module 210, and the write processing module 220 are described later with reference to FIG. 8 to FIG. 18.

Figure 3:
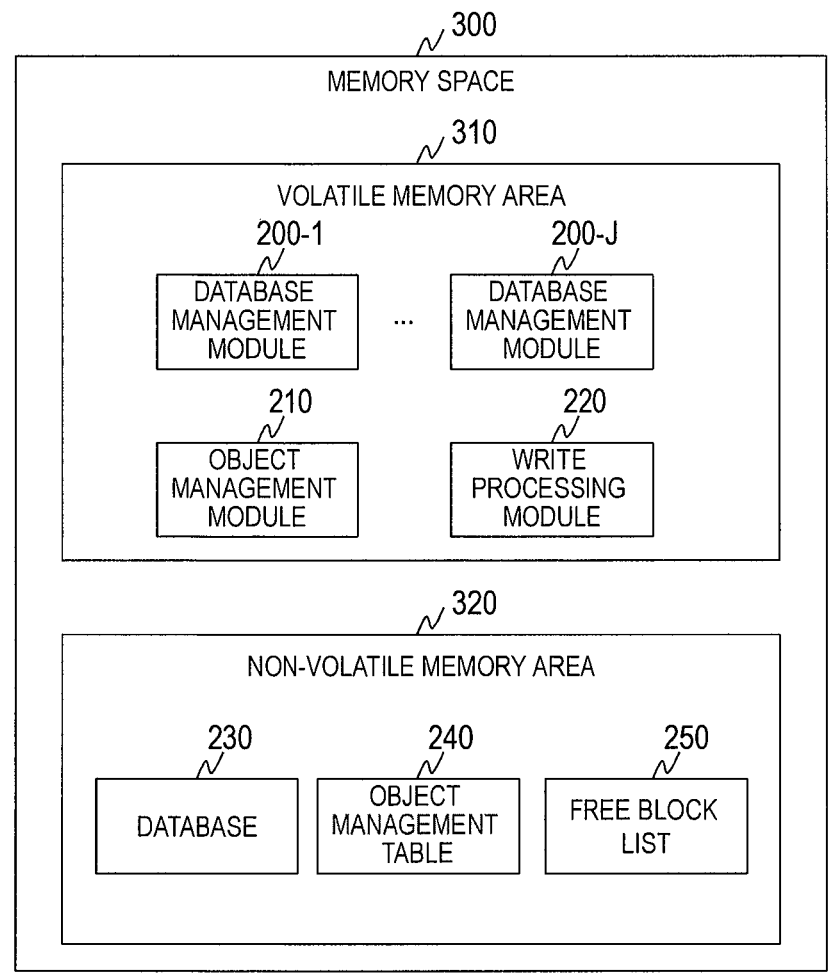
FIG. 3 is an explanatory diagram for illustrating a configuration of a memory space in the computer according to the first embodiment.

FIG. 3 is an explanatory diagram for illustrating a configuration of a memory space 300 in the computer 100 according to the first embodiment. The computer 100 includes the volatile memory 121 and the non-volatile memory 122 as the main memory. Thus, the memory space 300 is formed of a volatile memory area 310 provided by the volatile memory 121 and a non-volatile memory area 320 provided by the non-volatile memory 122.

In this embodiment, programs for implementing the database management module 200, the object management module 210, and the write processing module 220 are stored in the volatile memory area 310, and the database 230, the object management table 240, and the free block list 250 are stored in the non-volatile memory area 320.

For example, in a case where a failure occurs in the database management module 200, when a program for implementing the database management module 200 is stored in the non-volatile memory area 320, the failure may permanently be left as it is. Therefore, programs for implementing respective processing modules are stored in the volatile memory area 310 in order that the failure state is not left as it is.

As a method of implementing the memory control as illustrated in FIG. 3, there is given a method of setting, in a UEFI or a BIOS in advance, an address area for mapping the volatile memory area 310 and the non-volatile memory area 320. With this, at the time of startup of the computer 100, a boot loader loads the OS into the volatile memory area 310, and then the OS reads programs for implementing respective functional modules into the volatile memory area 310 and various pieces of information into the non-volatile memory area 320.

In this embodiment, the computer 100 includes the volatile memory 121 and the non-volatile memory 122. However, the computer 100 may include only the non-volatile memory 122. In this case, the memory space 300 entirely corresponds to the non-volatile memory area 320.

FIG. 4 is an explanatory diagram for illustrating a configuration example of the database 230 according to the first embodiment.

The database 230 includes a plurality of database objects 400. The database object 400 is an object such as a view or a table, which is handled in the database. In this embodiment, a description is given taking a table format object as an example. However, this embodiment is not limited by the data format of the database object 400.

The database object 400 is table format data including a plurality of records. The database object 400 illustrated in FIG. 4 includes L records. Each record is formed of two pieces of data, specifically, control data 410 and record data 420.

The record data 420 is data of a record, and it is understood that each record illustrated in FIG. 4 is data formed of N columns 421. The control data 410 is data for controlling each record. In this embodiment, the result of transaction processing is reflected in the database object 400 based on the control data 410. The control data 410 includes an O_ID 411, an R_ID 412, an X_ID 413, a C_ID 414, a UPD 415, an UNDO 416, and a DEL 417.

The O_ID 411 is an identifier of the database object 400. The R_ID 412 is an identifier of a record in the database object 400. The identifier of data, for example, a file name, is included in the record data 420.

The X_ID 413 is an identifier of a transaction, which is a unit of processing that uses the database. The C_ID 414 is an identifier of a command executed for a record.

The UPD 415, the UNDO 416, and the DEL 417 are flags each indicating the condition of a record.

The UPD 415 is a flag indicating whether or not the relevant record is a record to be newly added or a record to be updated, and stores any one of "0" and "1". The UNDO 416 is a flag indicating whether or not the relevant record is a record before update, and stores any one of "0" and "1". The DEL 417 is a flag indicating whether or not the relevant record is a record to be deleted, and stores any one of "0" and "1". Now, a description is given of a relationship between a combination of flags and the state of a record.

In a case where the UPD 415, the UNDO 416, and the DEL 417 are all "0", it means that the relevant record is a record before the start of transaction processing or an already committed record. In a case where the UPD 415 is "1", and the UNDO 416 and the DEL 417 are "0", it means that the relevant record is a record to be updated or to be added by the database management module 200. In a case where the UPD 415 and the DEL 417 are "0", and the UNDO 416 is "1", it means that the relevant record is a record before update. In a case where the UPD 415 and the UNDO 416 are "0", and the DEL 417 is "1", it means that the relevant record is a record to be deleted by the database management module 200.

On the basis of the combinations described above, it is understood that a record whose UPD 415 or DEL 417 is "1" is a record before commit. Further, in this embodiment, the control data 410 is operated such that a combination of flags other than those described above is not generated. Thus, in case where a combination of flags other than those described above is generated, it means that some error occurs.

FIG. 5 is a table for showing an example of the object management table 240 according to the first embodiment.

The object management table 240 stores information for managing the database object 400. Specifically, the object management table 240 stores an O_ID 501, a type 502, an object definition 503, and a start pointer 504.

The O_ID 501 is an identifier of the database object 400, which is the same as the O_ID 411. The type 502 indicates a type of the database object 400. Information such as "view" or "index" is stored in the type 502. The object definition 503 is definition information of a data structure of the database object 400. Information such as the number of columns and the size of data stored in each column is stored in the object definition 503. The start pointer 504 is a pointer for accessing the database object 400. A head address of a memory area storing the database object 400 or other information is stored in the start pointer 504.

Now, a description is given of arrangement of the database object 400 in the main memory and the cache memory. FIG. 6 is an explanatory diagram for illustrating an example of data arrangement in the main memory and the cache memory according to the first embodiment.

One record 430 of the database object 400 is divided into units of memory blocks 600, and stored in the plurality of memory blocks 600 of the non-volatile memory 122. In FIG. 6, a record 1 (430-1) of the database object 400 is stored into three memory blocks 600, specifically, a memory block 1 (600-1), a memory block 2 (600-2), and a memory block 3 (600-3) of the non-volatile memory 122.

Further, the processor 110 reads data of a record to be used for processing in units of the memory blocks 600, and stores the read data into a cache line 610. In FIG. 6, for example, data stored in the memory block 1 (600-1) is stored in a cache line 1 (610-1). A memory management unit (not shown) installed on the system determines a cache line for storing data based on a logical address specified by a data write instruction of a program.

FIG. 7 is an explanatory diagram for illustrating an example of the free block list 250 according to the first embodiment.

The free block list 250 manages a plurality of entries 700 as list format data. The entry 700 includes a list pointer 701 and a memory block pointer 702.

The list pointer 701 is a pointer indicating the next entry 700 of the entry 700 in the free block list 250. All the entries 700 included in the free block list 250 can be traced based on the list pointer 701. A head address of a memory area storing the next entry 700 or other information is stored in the list pointer 701.

The memory block pointer 702 is a pointer for accessing the memory block 600 that does not store data. A head address of the memory block 600 or other information is stored in the memory block pointer 702.

Figure 8:
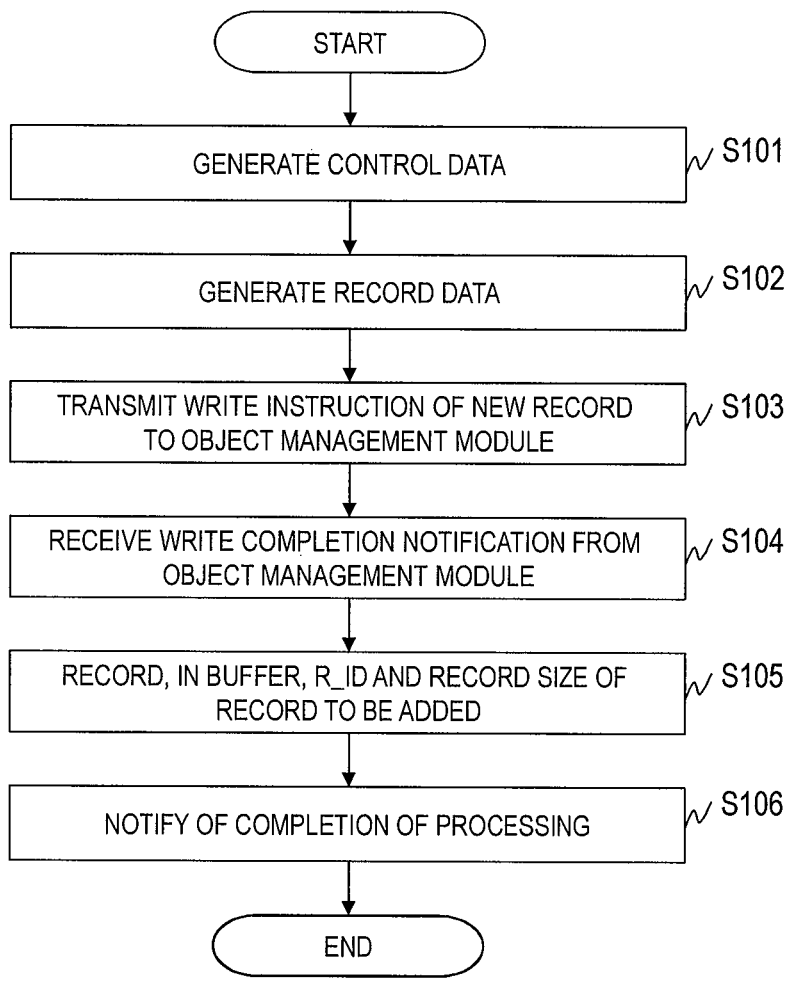
FIG. 8 is a flowchart for illustrating an example of addition processing to be executed by a database management module according to the first embodiment.

FIG. 8 is a flowchart for illustrating an example of addition processing to be executed by the database management module 200 according to the first embodiment.

The database management module 200 starts addition processing in a case of receiving an addition instruction of the record 430 from, for example, the client apparatus 101. At this time, the O_ID, the R_ID, and other information are input to the database management module 200.

The database management module 200 generates the control data 410 of the new record 430 (Step S101). Specifically, the database management module 200 sets the O_ID 411, the R_ID 412, the X_ID 413, and the C_ID 414 to predetermined values. Further, the database management module 200 sets the UPD 415 to "1", and sets the UNDO 416 and the DEL 417 to "0".

The database management module 200 generates the record data 420 of the new record 430 (Step S102). Widely known processing may be performed as the processing of generating the record data 420, and thus a detailed description thereof is omitted here. The database management module 200 calculates the size of the new record 430 based on the generated control data 410 and the generated record data 420.

The database management module 200 transmits a write instruction of the new record 430 to the object management module 210 (Step S103). The write instruction includes the control data 410, the record data 420, and the record size of the new record 430.

The database management module 200 receives a write completion notification from the object management module 210 (Step S104), and records, in the buffer, the R_ID 412 and the record size of the record 430 to be added (Step S105).

The database management module 200 notifies, for example, the client apparatus 101 on which a process that has instructed addition of the new record 430 is running of the completion of processing (Step S106), and ends the addition processing.

Figure 9:
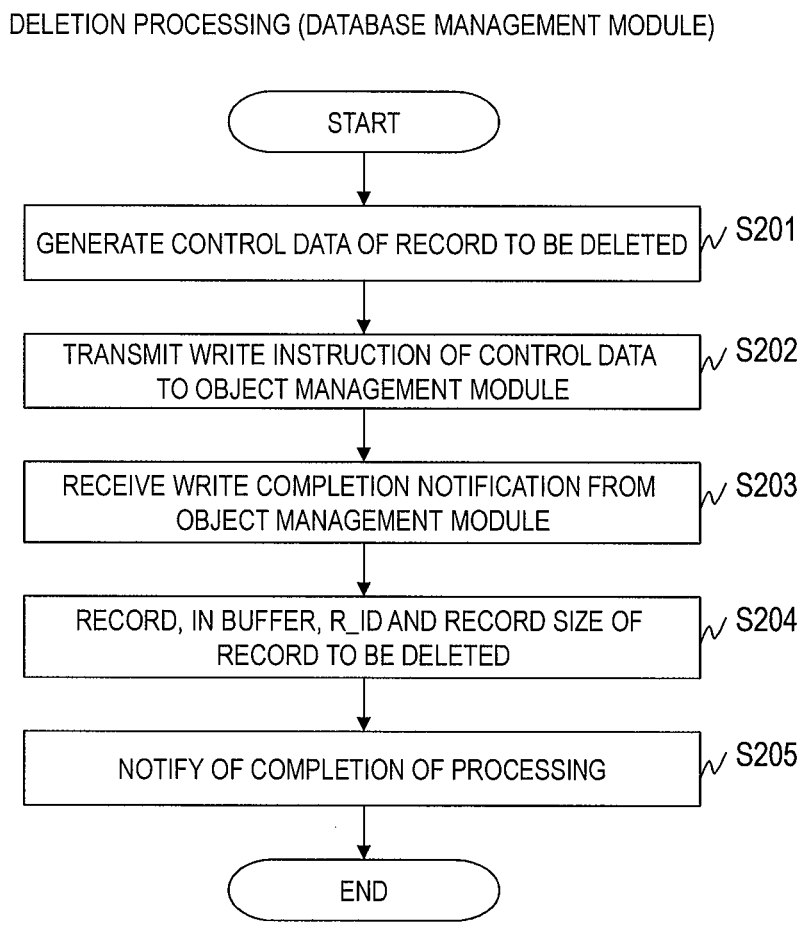
FIG. 9 is a flowchart for illustrating an example of deletion processing to be executed by the database management module according to the first embodiment.

FIG. 9 is a flowchart for illustrating an example of deletion processing to be executed by the database management module 200 according to the first embodiment.

The database management module 200 starts deletion processing in response to reception of a deletion instruction of the record 430 from, for example, the client apparatus 101. At this time, the O_ID, the R_ID, and other information are input to the database management module 200. The database management module 200 generates the control data 410 for setting the record 430 to be deleted (Step S201). Specifically, the database management module 200 sets the O_ID 411, the R_ID 412, the X_ID 413, and the C_ID 414 to predetermined values. Further, the database management module 200 sets the DEL 417 to "1", and sets the UPD 415 and the UNDO 416 to "0".

The database management module 200 transmits a write instruction of the control data 410 to the object management module 210 (Step S202).

The database management module 200 receives a write completion notification from the object management module 210 (Step S203), and records, in the buffer, the R_ID 412 and the record size of the record 430 to be deleted (Step S204).

The database management module 200 notifies, for example, the client apparatus 101 on which a process that has requested deletion of the record 430 is running of the completion of processing (Step S205), and ends the deletion processing.

In this embodiment, even when the database management module 200 is instructed to delete the record 430, the database management module 200 does not delete the record 430 at this timing. This embodiment has a feature in that the database management module 200 generates the control data 410 in order to delete the record 430 at the time of commit. In other words, the database management module 200 uses the record itself stored in the database object 400 as a log.

Figure 10:
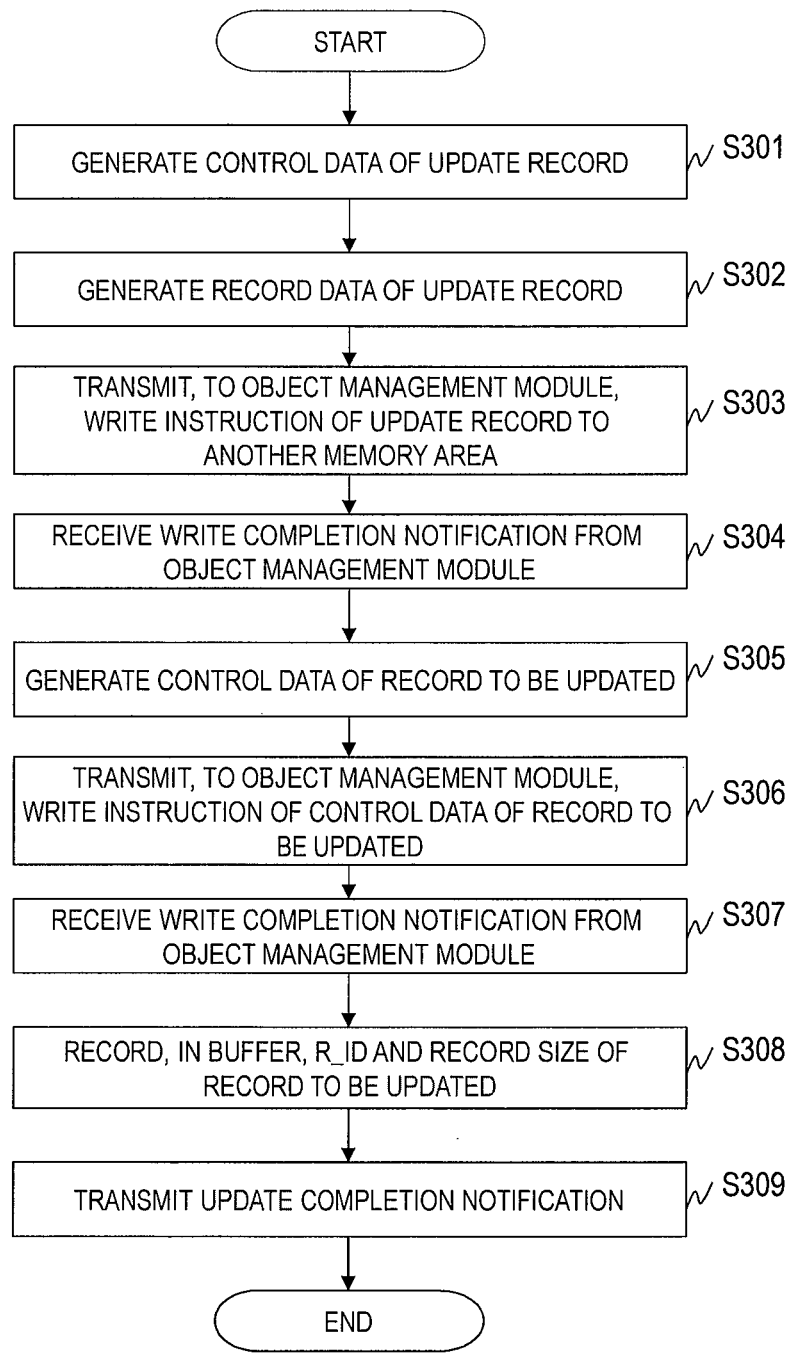
FIG. 10 is a flowchart for illustrating an example of update processing to be executed by the database management module according to the first embodiment.

FIG. 10 is a flowchart for illustrating an example of update processing to be executed by the database management module 200 according to the first embodiment.

The database management module 200 starts update processing in a case of receiving an instruction of updating the record 430 from, for example, the client apparatus 101. At this time, the O_ID, the R_ID, the value of the record data 420 to be updated, and other information are input to the database management module 200.

The database management module 200 first generates the update record 430 based on the input data. In this case, the update record 430 represents a record that is generated from overwrite data. In other words, the update record 430 corresponds to the record 430 whose data is updated.

The database management module 200 generates the control data 410 and the record data 420 of the update record 430 (Step S301 and Step S302).

Specifically, the database management module 200 sets the O_ID 411, the R_ID 412, the X_ID 413, and the C_ID 414 to predetermined values. Further, the database management module 200 sets the UPD 415 to "1", and sets the UNDO 416 and the DEL 417 to "0". Further, the database management module 200 uses the input values to generate the record data 420. The database management module 200 calculates the size of the update record 430 based on the generated control data 410 and record data 420.

The database management module 200 transmits, to the object management module 210, a write instruction of the update record 430 to a new memory area (Step S303). The write instruction of the update record 430 includes the control data 410, the record data 420, and the record size of the update record 430.

The database management module 200 receives a write completion notification from the object management module 210 (Step S304).

The database management module 200 generates the control data 410 of the record 430 to be updated (Step S305). Specifically, the database management module 200 sets the O_ID 411, the R_ID 412, the X_ID 413, and the C_ID 414 to predetermined values. Further, the database management module 200 sets the UNDO 416 to "1", and sets the UPD 415 and the DEL 417 to "0". In this case, the record 430 to be updated represents the record 430 that is not updated yet. In other words, the record 430 to be updated corresponds to the record 430 whose data is not overwritten yet.

The database management module 200 transmits, to the object management module 210, a write instruction of the control data 410 of the record 430 to be updated (Step S306). The write instruction of the control data 410 of the record 430 to be updated includes the control data 410 of the record to be updated.

The database management module 200 receives a write completion notification from the object management module 210 (Step S307), and records, in the buffer, the R_ID 412 and the record size of the record 430 to be updated (Step S308).

The database management module 200 notifies, for example, the client apparatus 101 on which a process that has requested update of the record 430 is running of the completion of processing (Step S309), and ends the update processing.

In this embodiment, even when the database management module 200 is instructed to update the record 430, the database management module 200 does not directly update the record 430 at this timing. This embodiment has a feature in that the database management module 200 generates the update record 430 in order to ensure that the updated record 430 is added at the time of commit. In other words, the database management module 200 uses the record itself stored in the database object 400 as a log.

Figure 11:
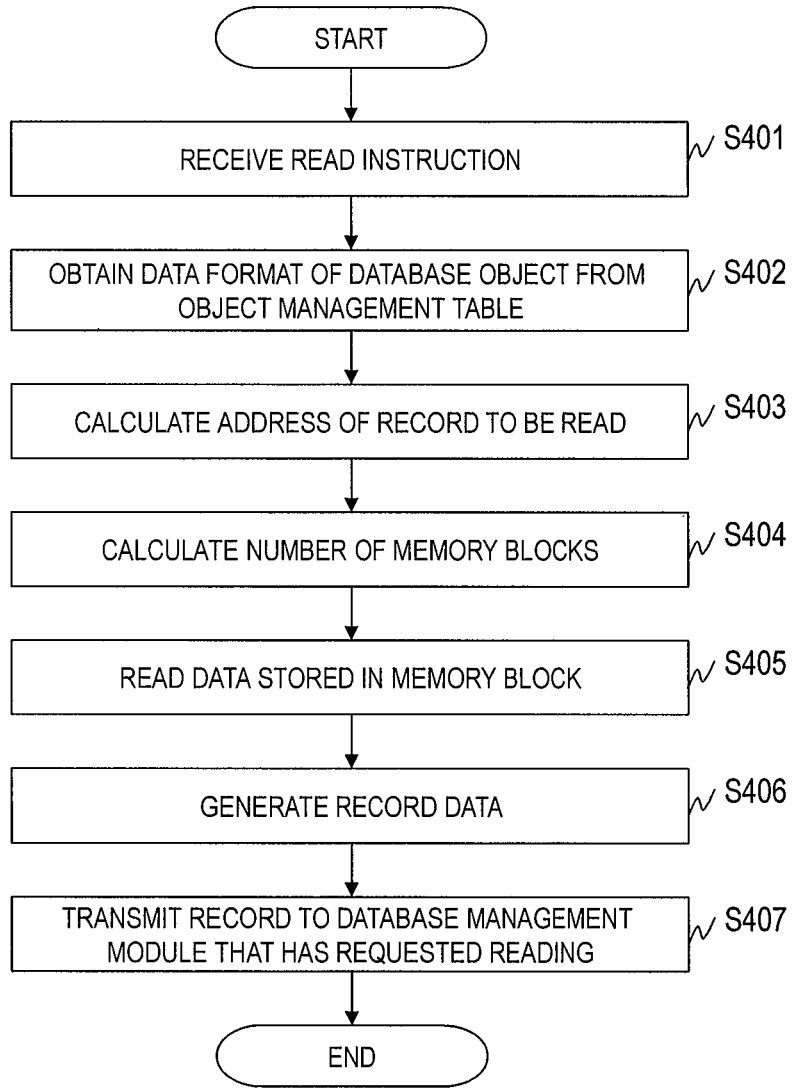
FIG. 11 is a flowchart for illustrating an example of record read processing to be executed by an object management module according to the first embodiment.

FIG. 11 is a flowchart for illustrating an example of record read processing to be executed by the object management module 210 according to the first embodiment.

The object management module 210 receives a read instruction of the record 430 from the database management module 200 (Step S401). The read instruction includes the O_ID of the database object 400 including the record 430 to be read, and the R_ID and the record size of the record 430 to be read.

The object management module 210 refers to the object management table 240 to acquire the data format of the database object 400 to be accessed (Step S402). Specifically, the object management module 210 retrieves an entry having the O_ID 501 matching with the input O_ID, and acquires pieces of information stored in the type 502 and the object definition 503 of the retrieved entry.

The object management module 210 calculates an address of the record 430 to be read in the main memory (Step S403). Specifically, the object management module 210 applies a predefined hash function to the R_ID of the record 430 to be read, to thereby calculate the address of the record 430 to be read in the main memory. Another widely known method may be used to calculate the address of the record 430.

The object management module 210 calculates the number of memory blocks 600 storing data of the record 430 to be read based on the input record size (Step S404).

The object management module 210 reads the data stored in the memory blocks 600 of the main memory based on the calculated address and the number of memory blocks 600 (Step S405). Specifically, the object management module 210 identifies the memory block 600 corresponding to the calculated address. The object management module 210 starts from the identified memory block 600 to read the data stored in the memory blocks 600 by the calculated number of memory blocks 600.

The object management module 210 generates a record from the data read from the memory blocks 600 based on the data format acquired in Step S402 (Step S406). At this time, the same X_ID and C_ID are assigned to the data read from the memory blocks 600, and thus the object management module 210 deletes the X_ID and the C_ID from the data to generate a record.

The object management module 210 transmits the generated record to the database management module 200 that has requested reading (Step S407), and ends the processing.

Figure 12:
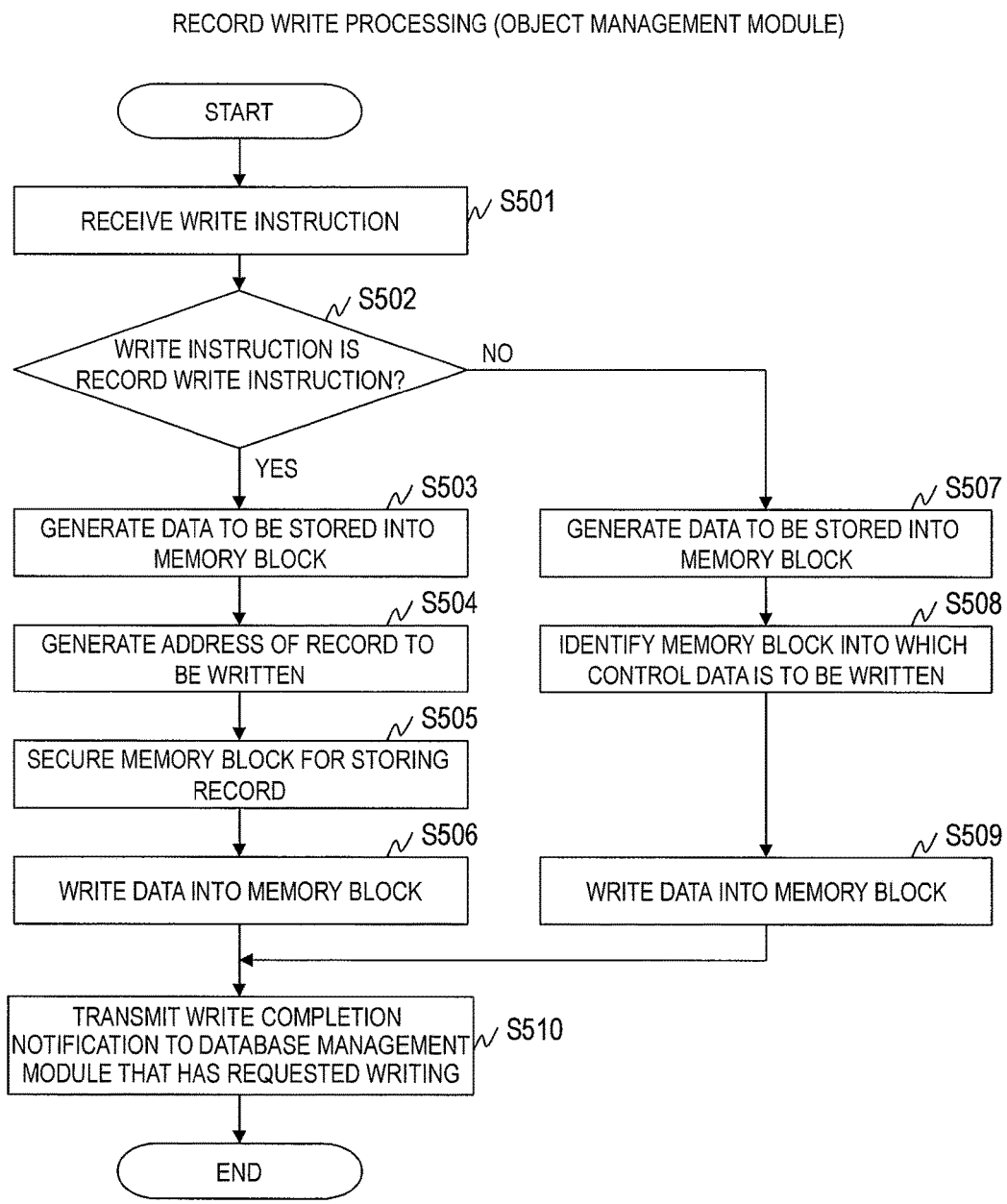
FIG. 12 is a flowchart for illustrating an example of record addition processing to be executed by the object management module according to the first embodiment.

FIG. 12 is a flowchart for illustrating an example of record addition processing to be executed by the object management module 210 according to the first embodiment.

The object management module 210 receives a write instruction from the database management module 200 (Step S501).

There are four types of write instructions in this embodiment, namely, a write instruction of the new record 430 (Step S103), a write instruction of the update record 430 (Step S303), a write instruction of the control data 410 of the record 430 to be deleted (Step S202), and a write instruction of the control data 410 of the record 430 to be updated (Step S306).

The write instruction of the new record 430 and the write instruction of the update record 430 each include the control data 410, the record data 420, and the record size. In the following description, the write instruction of the new record 430 and the write instruction of the update record 430 may collectively be referred to as "record write instruction". The write instructions of the control data 410 of the record 430 to be deleted and the control data 410 of the record 430 to be updated each include the control data 410. In the following description, the write instructions of the control data 410 of the record 430 to be deleted and the control data 410 of the record 430 to be updated may collectively be referred to as "control data write instruction".

The record write instruction and the control data write instruction may collectively be referred to as "write instruction" when those instructions are not distinguished from each other.

The object management module 210 determines whether or not the received write instruction is a record write instruction (Step S502). For example, the object management module 210 determines whether or not the received write instruction is a record write instruction based on the information included in the write instruction.

In a case where the received write instruction is determined to be a record write instruction, the object management module 210 uses the control data 410 and the record data 420 to generate data to be stored into the memory blocks 600 (Step S503). Specifically, the object management module 210 divides each of the control data 410 and the record data 420 into units of memory blocks, and assigns the same X_ID and C_ID to each of the divided pieces of data.

The object management module 210 calculates the address of the new record 430 or the update record in the main memory (Step S504).

Specifically, the object management module 210 applies a predefined hash function to the R_ID 412 included in the control data 410, to thereby calculate the address of the new record 430 or the update record 430 in the main memory. Another widely known method may be used to calculate the address of the record 430.

The object management module 210 secures the memory blocks 600 for storing the new record 430 or the update record 430 in the main memory (Step S505). Specifically, the object management module 210 refers to the free block list 250 to acquire the same number of entries 700 as that of the data generated in Step S503. At this time, the object management module 210 deletes the acquired entries 700 from the free block list 250.

The object management module 210 writes the data generated in Step S503 into the secured memory blocks 600 (Step S506). Specifically, the object management module 210 writes the generated data into the memory blocks 600 based on the memory block pointers 702 of the acquired entries 700.

The object management module 210 transmits a write completion notification to the database management module 200 that has requested writing (Step S510), and ends the processing.

In Step S502, in a case where the received write instruction is determined to be a control data write instruction, the object management module 210 uses the control data 410 to generate data to be stored into the memory blocks 600 (Step S507). Specifically, the object management module 210 divides the control data 410 in units of memory blocks, and assigns the same X_ID and C_ID to each of the divided pieces of data.

The object management module 210 identifies the memory blocks 600 into which the control data 410 is to be written (Step S508).

Specifically, the object management module 210 applies a predefined hash function to the R_ID 412 included in the control data 410, to thereby calculate the address of the record 430 to be updated in the main memory.

In this case, it is assumed that the control data 410 of the record 430 before update and the control data 410 of the record 430 after update have the same size. Thus, the control data 410 is written into the same number of memory blocks 600 as that of the generated data from the memory block 600 corresponding to the calculated address.

In a case where the size of the control data 410 changes due to update, the object management module 210 may execute processing similar to that of Step S505, to thereby secure the memory blocks 600 for storing the control data 410. In this case, the object management module 210 deletes the control data 410 before update from the memory blocks 600 storing that data.

The object management module 210 writes the data generated from the control data 410 into the identified memory blocks 600 (Step S509). In this manner, the control data 410 of the record 430 to be deleted or the record 430 to be updated is updated.

The object management module 210 transmits a write completion notification to the database management module 200 that has requested writing (Step S510), and ends the processing.

Figure 13:
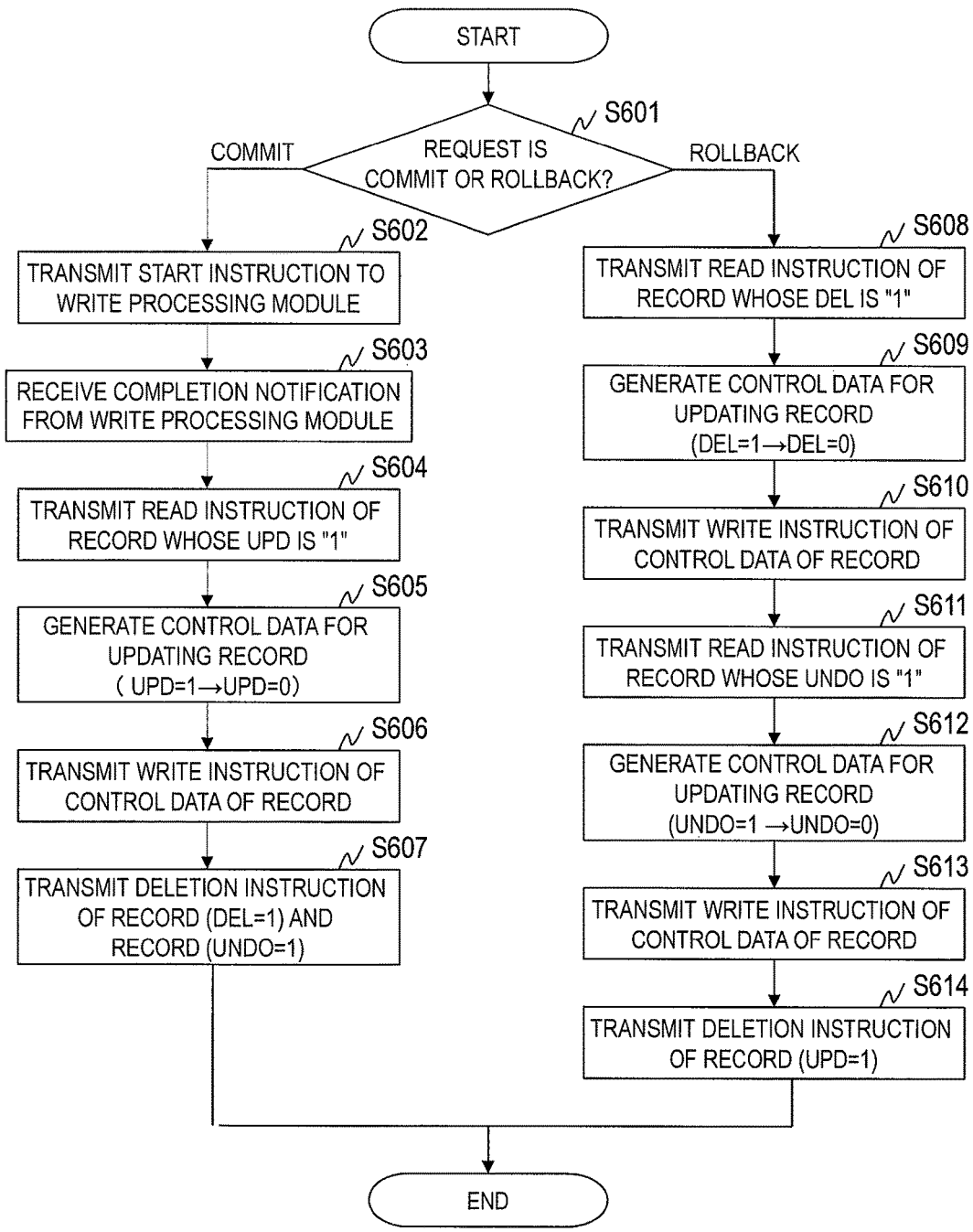
FIG. 13 is a flowchart for illustrating an example of commit processing and rollback processing to be executed by the database management module according to the first embodiment.

FIG. 13 is a flowchart for illustrating an example of commit processing and rollback processing to be executed by the database management module 200 according to the first embodiment.

The database management module 200 starts processing in response to reception of a request. The database management module 200 determines whether or not the received request is a commit or a rollback (Step S601). In this embodiment, it is assumed that a commit statement or a rollback statement is clearly specified in an SQL statement.

In a case where the received request is determined to be a commit, the database management module 200 transmits a start instruction to the write processing module 220 (Step S602). This instruction includes the R_ID and the record size recorded in the buffer. The processing to be executed by the write processing module 220 is described later with reference to FIG. 15.

The database management module 200 receives a completion notification from the write processing module 220 (Step S603), and then transmits a read instruction of the record 430 whose UPD 415 is "1" to the object management module 210 (Step S604).

In a case where the object management module 210 receives the read instruction, the object management module 210 executes the processing of Step S401 and Step S402, and then refers to the control data 410 of all the records 430 in the database object 400 to retrieve the record 430 whose UPD 415 is "1". After that, the object management module 210 executes the processing of from Step S403 to Step S407 for the retrieved record 430.

The database management module 200 receives the record 430 from the object management module 210, and then generates the control data 410 for updating the read record 430 (Step S605). Specifically, the database management module 200 sets the O_ID 411, the R_ID 412, the X_ID 413, and the C_ID 414 to predetermined values. Further, the database management module 200 sets the UPD 415, the UNDO 416, and the DEL 417 to "0".

The database management module 200 transmits a write instruction of the control data 410 of the record 430 to the object management module 210 (Step S606). The write instruction of the control data 410 of the record 430 includes the control data 410 of the record 430 generated in Step S605.

In a case where the object management module 210 receives the write instruction, the object management module 210 executes the processing of from Step S507 to Step S510.

The database management module 200 transmits a deletion instruction of the record 430 whose UNDO 416 is "1" and the record 430 whose DEL 417 is "1" to the object management module 210 (Step S607). The deletion instruction of those records 430 includes information indicating the deletion condition of the record 430, namely, information indicating that the record 430 whose UNDO 416 is "1" and the record 430 whose DEL 417 is "1" are to be deleted. The processing to be executed by the object management module 210 in a case where the object management module 210 receives a deletion instruction is described later with reference to FIG. 14.

The database management module 200 receives a write completion notification and a deletion completion notification from the object management module 210, and ends the processing.

In a case where the received request is determined to be a rollback, the database management module 200 transmits a read instruction of the record 430 whose DEL 417 is "1" to the object management module 210 (Step S608). The processing of Step S608 is similar to that of Step S604, and thus a description thereof is omitted here.

The database management module 200 receives a read completion notification from the object management module 210, and then generates the control data 410 for updating the read record 430 (Step S609). Specifically, the database management module 200 sets the O_ID 411, the R_ID 412, the X_ID 413, and the C_ID 414 to predetermined values. Further, the database management module 200 sets the UPD 415, the UNDO 416, and the DEL 417 to "0".

The database management module 200 transmits a write instruction of the control data 410 of the record 430 to the object management module 210 (Step S610). The write instruction of the control data 410 of the record 430 includes the control data 410 of the record 430 generated in Step S609.

In a case where the object management module 210 receives the write instruction, the object management module 210 executes the processing of from Step S507 to Step S510.

The database management module 200 transmits a read instruction of the record 430 whose UNDO 416 is "1" to the object management module 210 (Step S611). The processing of Step S611 is similar to that of Step S604, and thus a description thereof is omitted here.

The database management module 200 receives a read completion notification from the object management module 210, and then generates the control data 410 for updating the read record 430 (Step S612). Specifically, the database management module 200 sets the O_ID 411, the R_ID 412, the X_ID 413, and the C_ID 414 to predetermined values. Further, the database management module 200 sets the UPD 415, the UNDO 416, and the DEL 417 to "0".

The database management module 200 transmits a write instruction of the control data 410 of the record 430 to the object management module 210 (Step S613). The write instruction of the control data 410 of the record 430 includes the control data 410 of the record 430 generated in Step S612.

In a case where the object management module 210 receives the write instruction, the object management module 210 executes the processing of from Step S507 to Step S510.

The database management module 200 transmits a deletion instruction of the record 430 whose UPD 415 is "1" to the object management module 210 (Step S614). The processing to be executed by the object management module 210 in a case where the object management module 210 receives a deletion instruction is described later with reference to FIG. 14.

The database management module 200 receives a write completion notification and a deletion completion notification from the object management module 210, and ends the processing.

Figure 14:
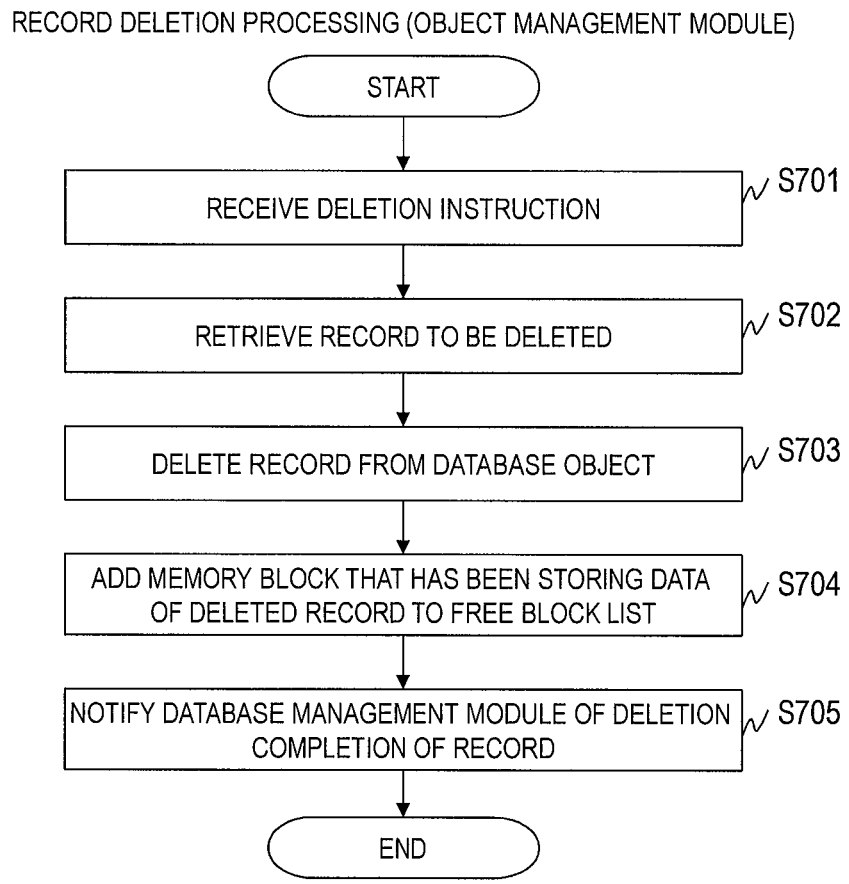
FIG. 14 is a flowchart for illustrating an example of record deletion processing to be executed by the object management module according to the first embodiment.

FIG. 14 is a flowchart for illustrating an example of record deletion processing to be executed by the object management module 210 according to the first embodiment.

The object management module 210 receives a deletion instruction from the database management module 200 (Step S701). The object management module 210 retrieves a record to be deleted based on the condition of the record 430 to be deleted included in the deletion instruction (Step S702).

For example, in a case where the record 430 whose UNDO 416 is "1" is the record 430 to be deleted, the object management module 210 refers to the database object 400 to retrieve the record 430 whose UNDO 416 is "1". The retrieve processing is a widely known technology, and thus a detailed description thereof is omitted here.

The object management module 210 deletes the record 430 retrieved from the database object 400 (Step S703). The object management module 210 adds the memory block 600 that has been storing data of the deleted record 430 to the free block list 250 (Step S704).

Specifically, the object management module 210 generates the entry 700, and sets the memory block pointer 702 to the address of the memory block 600 that has been storing the deleted data of the record 430. Further, the object management module 210 retrieves an entry whose list pointer 701 is "NULL", and sets the list pointer 701 to the address of the entry 700 newly generated. The object management module 210 executes the processing described above repeatedly by the number of memory blocks 600 to be added. The object management module 210 transmits a deletion completion notification to the database management module 200 that has requested deletion (Step S705), and ends the processing.

Figure 15:
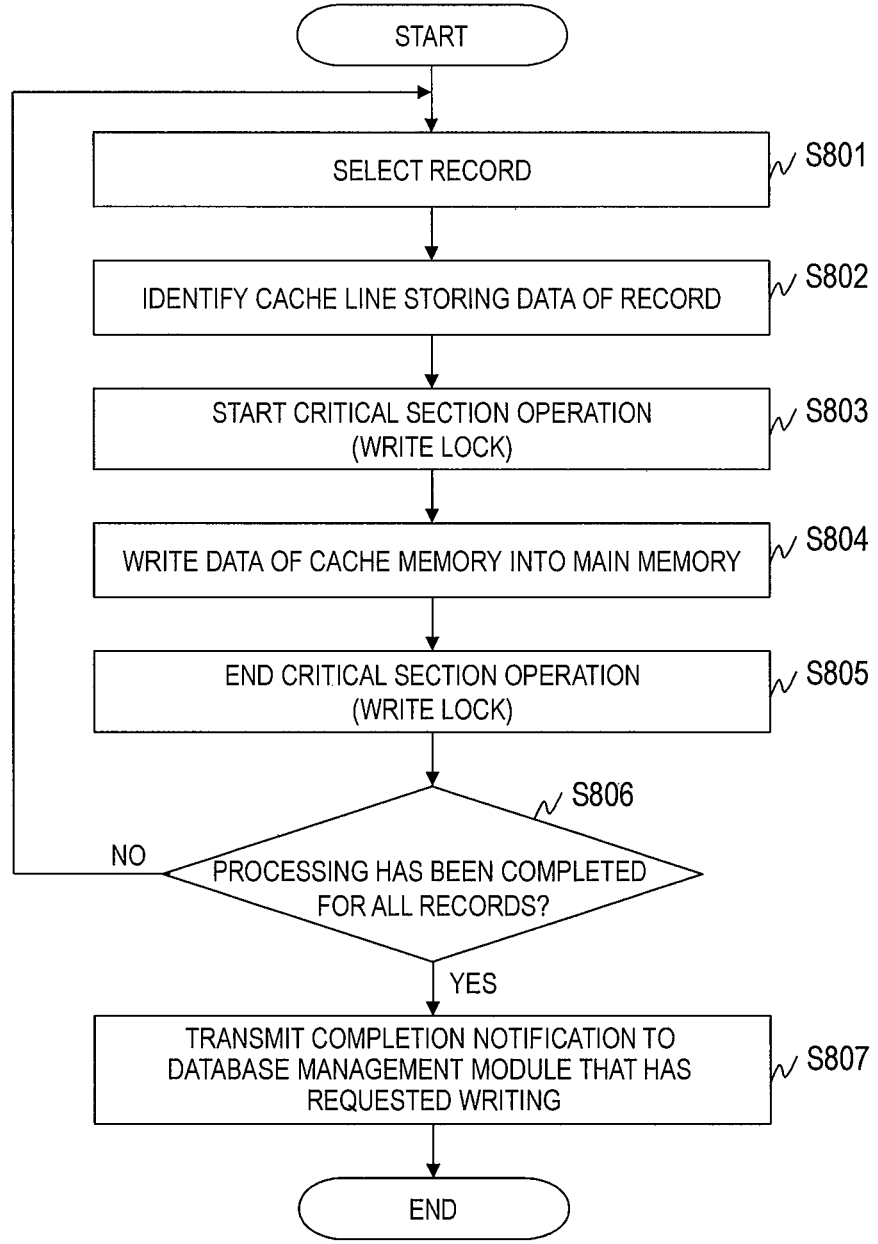
FIG. 15 is a flowchart for illustrating an example of write processing of data to be stored into a cache memory to be executed by a write processing module according to the first embodiment.

FIG. 15 is a flowchart for illustrating an example of write processing of data to be stored into a cache memory to be executed by the write processing module 220 according to the first embodiment. FIG. 16A, FIG. 16B, and FIG. 16C are each an explanatory diagram for illustrating an example of a program code to be used for the write processing of data to be stored into the cache memory according to the first embodiment.

The write processing module 220 starts processing in response to reception of a start instruction from the database management module 200. The start instruction includes the R_ID and the record size of the record 430.

The write processing module 220 selects one record 430 to be processed (Step S801). The write processing module 220 identifies the cache line 610 storing the data of the record 430 to be processed (Step S802). Specifically, the write processing module 220 executes the following processing.

The write processing module 220 first applies a predefined hash function to the R_ID, to thereby calculate the address of the record 430 in the main memory. The write processing module 220 divides the record size by the size of the cache line 610, to thereby calculate the number of memory blocks 600 for storing the data of the record 430.

The write processing module 220 calculates an offset based on the size of the cache line 610 and the number of memory blocks 600. This is the description of the processing of Step S802.

The write processing module 220 starts a critical section operation (Step S803). This is because data stored in the cache line 610 needs to be written into the main memory atomically. Thus, the write processing module 220 prohibits writing of data into the identified cache line 610.

The write processing module 220 writes the data stored in the cache memory into the main memory (Step S804). After the write processing module 220 finishes writing the data stored in the cache memory into the main memory, the write processing module 220 ends the critical section operation (Step S805). In this manner, prohibition of writing of data into the cache line 610 is released.

Now, a description is given of a program code to be used in a case where the write processing module 220 writes the data stored in the cache memory into the main memory. FIG. 16A is a program code for synchronizing the cache memory with the main memory. This program code includes a write instruction of data stored in the cache memory. In the example illustrated in FIG. 16A, "BulkWtMM(linear address)" corresponds to the write instruction.

FIG. 16B and FIG. 16C are each an example of a program code that defines the write instruction.

The program code of FIG. 16B gives an instruction for writing data included in all the cache lines 610 storing data of a record corresponding to an address specified in (linear address) and then the data is deleted from those cache lines 610.

The program code of FIG. 16C gives an instruction for writing, among all the cache lines 610 storing data of a record corresponding to an address specified in (linear address), data included in the cache line 610 storing modified data and then the written data is read from the main memory. The program code of FIG. 16C is a program code for cache control in accordance with the MESIF protocol.

The program code for writing data stored in the cache memory into the main memory is not limited to the one described above.

Next, the write processing module 220 determines whether or not the processing has been completed for all the records 430 corresponding to all the R_IDs included in the start instruction (Step S806).

In a case where it is determined that the processing has not been completed for all the records 430, the write processing module 220 returns to Step S801 and executes the processing of from Step S802 to Step S806 for another record 430.

In a case where it is determined that the processing has been completed for all the records 430, the write processing module 220 transmits a completion notification to the database management module 200 that has requested writing (Step S807), and ends the processing.

Figure 17A:
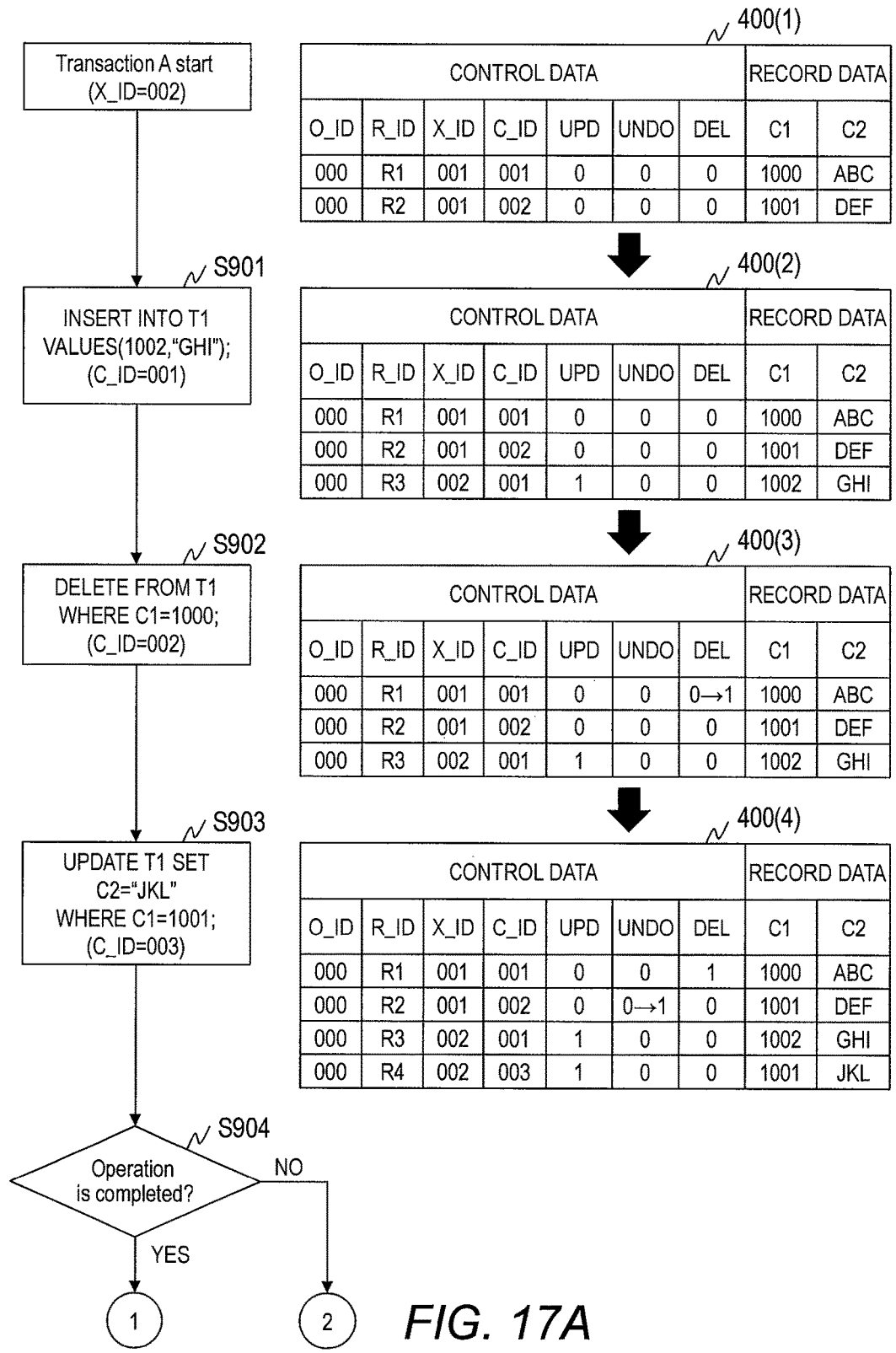
FIG. 17A, FIG. 17B, and FIG. 17C are each a flowchart for illustrating a flow of transaction processing according to the first embodiment.
Figure 17B:
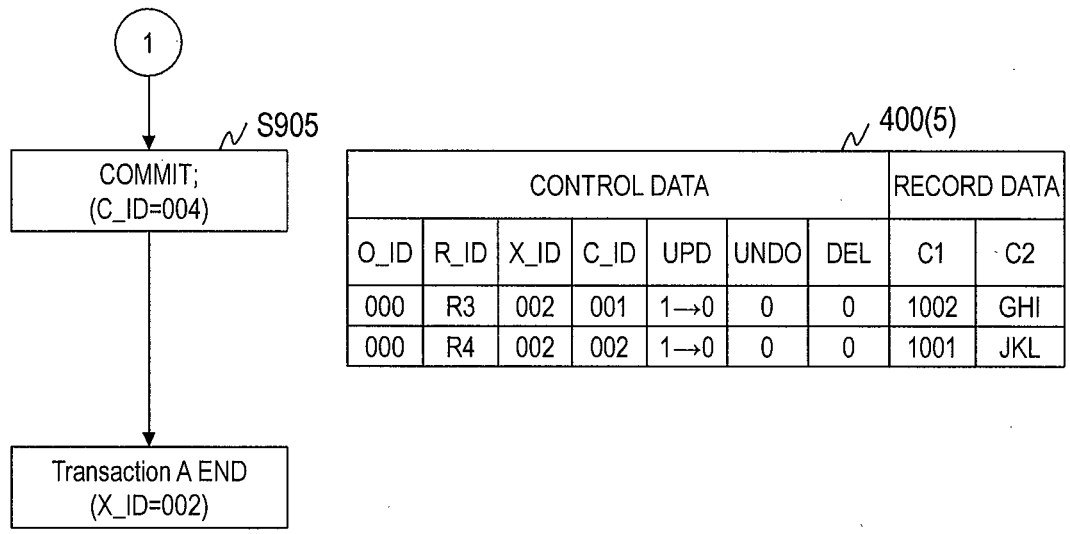
Figure 17C:
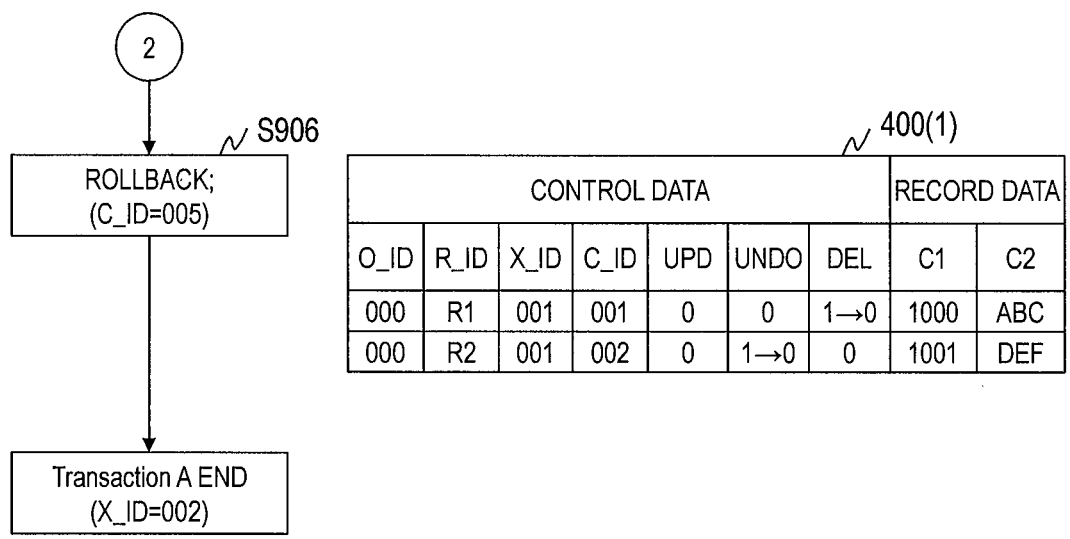

Now, a description is given of a flow of processing according to this embodiment through use of a specific example. FIG. 17A, FIG. 17B, and FIG. 17C are each a flowchart for illustrating a flow of transaction processing according to the first embodiment.

In the following description, a flow of transaction processing when the X_ID is "002" is illustrated. Further, the database object 400 (1) is assumed at the start of the transaction processing. The record data 420 includes two columns "C1" and "C2". The column "C1" is an identifier of the record data 420 and the column "C2" is an actual value of the record data 420.

First, the client apparatus 101 requests addition of the new record 430 whose column C1 is "1002" and column C2 is "GHI" (Step S901). The identifier of the command for adding the new record 430 is assumed to be 001. In this case, the following processing is executed.

The database management module 200 instructs the object management module 210 to write the new record 430 whose column C1 is "1002" and column C2 is "GHI" (Step S103).

The object management module 210 adds, to the database object 400 (1), the record 430 whose O_ID 411, R_ID 412, X_ID 413, C_ID 414, UPD 415, UNDO 416, and DEL 417 are "000", "R3", "002", "001", "1", "0", and "0", respectively (Step S506). As a result, the database object 400 (1) transitions to the database object 400 (2).

Next, the client apparatus 101 requests deletion of the record 430 whose column C1 is "1000" (Step S902). The identifier of the command for deleting the record is assumed to be "002". In this case, the following processing is executed.

The database management module 200 instructs the object management module 210 to overwrite the control data 410 of the record 430 whose column C1 is "1000" (Step S202).

The object management module 210 overwrites the control data 410 of the record 430 whose column C1 is "1000" (Step S509). In this manner, the DEL 417 of the record 430 is updated from "0" to "1". As a result, the database object 400 (2) transitions to the database object 400 (3).

Next, the client apparatus 101 requests update of the value of the column C2 to "JKL" for a record whose column C1 is "1001" (Step S903). The identifier of the command for updating the record is assumed to be "003". In this case, the following processing is executed.

The database management module 200 gives an instruction to write an update record whose column C1 is "1001" and column C2 is "JKL" (Step S303).

The object management module 210 adds the record 430 whose O_ID 411, R_ID 412, X_ID 413, C_ID 414, UPD 415, UNDO 416, and DEL 417 are 000, "R4", "002", "003", "1", "0", and "0", respectively (Step S506).

The database management module 200 gives an instruction to overwrite the control data 410 of the record 430 to be updated (Step S306).

The object management module 210 overwrites the control data 410 of the record 430 whose column C1 is "1001" and UNDO 416 is "0" (Step S509). In this manner, the UNDO 416 of the record 430 is updated from "0" to "1".

Through the processing described above, the database object 400 (3) transitions to the database object 400 (4).

The client apparatus 101 determines whether or not all of a series of operations have been completed (Step S904).

In a case where all of the series of operations have been completed, the client apparatus 101 requests for a commit (Step S905). The identifier of the command for commit is assumed to be "004". In this case, the following processing is executed.

The database management module 200 transmits a start instruction of processing to be executed by the write processing module 220 (Step S602). The database management module 200 receives a completion notification from the write processing module 220 (Step S603), and then gives an instruction to overwrite the control data 410 of the record 430 whose UPD 415 is "1" (Step S606).

The object management module 210 overwrites the control data 410 of the record 430 whose UPD 415 is "1" (Step S509). In this manner, the UPD 415 of the record 430 is updated from "1" to "0".

The database management module 200 gives an instruction to delete the record 430 whose UNDO 416 is "1" and the record 430 whose DEL 417 is "1" (Step S607).

The object management module 210 retrieves the record 430 whose UNDO 416 is "1" and the record 430 whose DEL 417 is "1" (Step S702), and deletes the record 430 retrieved from the database object 400 (Step S703).

Through the processing described above, the database object 400 (4) transitions to the database object 400 (5).

On the contrary, in a case where all of the series of operations have not been completed, that is, the processing has failed, the client apparatus 101 requests for a rollback (Step S906). The identifier of the command for rollback is assumed to be "005". In this case, the following processing is executed.

The database management module 200 gives an instruction to overwrite the control data 410 of the record whose DEL 417 is "1" (Step S610).

The object management module 210 overwrites the control data 410 of the record 430 whose DEL 417 is "1" (Step S509). In this manner, the DEL 417 of the record 430 is updated from "1" to "0".

The database management module 200 gives an instruction to overwrite the control data 410 of the record whose UNDO 416 is "1" (Step S613).

The object management module 210 overwrites the control data 410 of the record 430 whose UNDO 416 is "1" (Step S509). In this manner, the UNDO 416 of the record 430 is updated from "1" to "0".

The object management module 210 gives an instruction to delete the record 430 whose UPD 415 is "1" (Step S614).

The object management module 210 retrieves the record 430 whose UPD 415 is "1" (Step S702), and deletes the record 430 retrieved from the database object 400 (Step S703).

Through the processing described above, the database object 400 (4) returns to the database object 400 (1).

Figure 18:
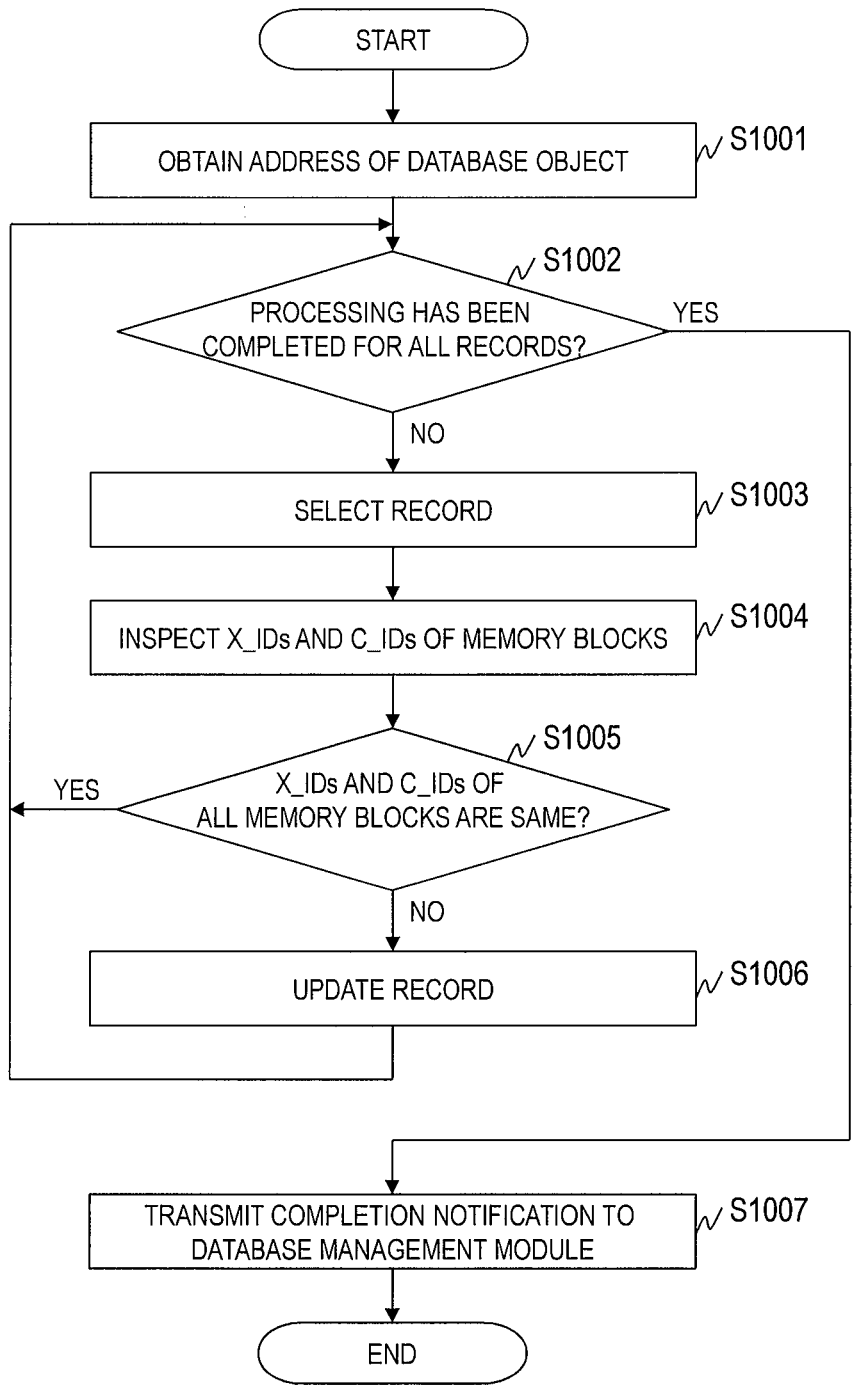
FIG. 18 is a flowchart for illustrating an example of rollback processing to be executed by the object management module according to the first embodiment.

FIG. 18 is a flowchart for illustrating an example of rollback processing to be executed by the object management module 210 according to the first embodiment.

In a case where a failure has occurred before completion of a commit and the object management module 210 receives an execution instruction of rollback processing from, for example, the database management module 200, the object management module 210 starts rollback processing described below. The execution instruction includes an identifier of the database object 400 to be processed.

The object management module 210 refers to the object management table 240 to acquire the address of the database object 400 to be processed (Step S1001). Specifically, the object management module 210 retrieves an entry having the O_ID 501 matching with an identifier included in the execution instruction, and acquires the address stored in the start pointer 504 of the retrieved entry.

The object management module 210 determines whether or not the processing has been completed for all the records 430 of the database object 400 (Step S1002).

In a case where it is determined that the processing has not been completed for all the records 430 of the database object 400, the object management module 210 selects one record 430 to be processed from the database object 400 (Step S1003). Specifically, the object management module 210 selects one R_ID.

The database management module 200 refers to the memory blocks 600 storing data of the selected record 430, and inspects the X_IDs and the C_IDs of the data stored in the memory blocks 600 (Step S1004). The database management module 200 determines whether or not the X_IDs and the C_IDs of the data stored in all the memory blocks 600 match with one another (Step S1005).

In a case where it is determined that the X_IDs and the C_IDs of the data stored in all the memory blocks 600 match with one another, the database management module 200 returns to Step S1002.

In a case where it is determined that the X_IDs and the C_IDs of the data stored in all the memory blocks 600 do not match with one another, the database management module 200 updates the record 430 having the same X_ID and C_ID (Step S1006), and then returns to Step S1002. Specifically, the write processing module 220 executes the following processing.

In a case where the record 430 has the control data 410 whose DEL 417 is "1", the database management module 200 transmits to the object management module 210 a write instruction for updating the DEL 417 to "0". In a case where the record 430 has the control data 410 whose UPD 415 is "1", the database management module 200 transmits to the object management module 210 a deletion instruction of the record 430. Further, in a case where the record 430 has the control data 410 whose UNDO 416 is "1", the database management module 200 transmits to the object management module 210 a write instruction for updating the UNDO 416 to "0". This is the description of the processing of Step S1006.

In Step S1002, in a case where it is determined that the processing has been completed for all the records 430 of the database object 400, the object management module 210 transmits a processing completion notification to the database management module 200 (Step S1007), and ends the processing.

Figure 19:
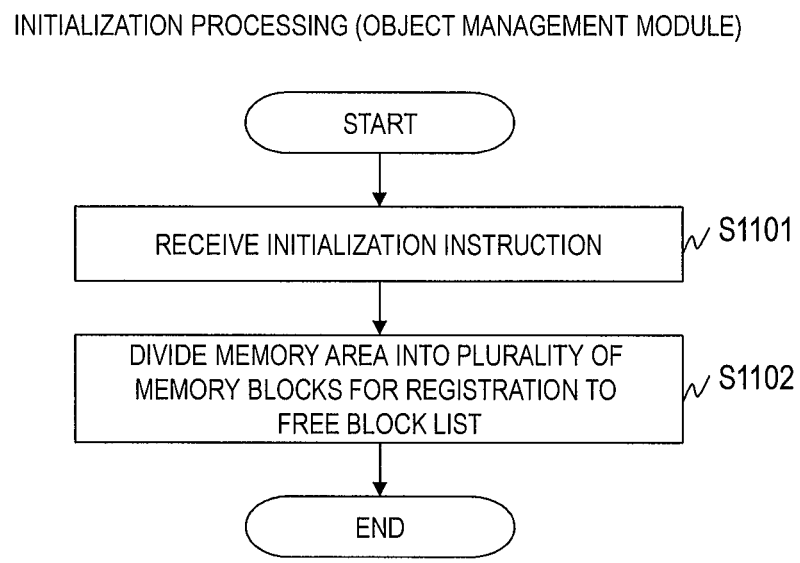
FIG. 19 is a flowchart for illustrating an example of initialization processing to be executed by the object management module according to the first embodiment.

FIG. 19 is a flowchart for illustrating an example of initialization processing to be executed by the object management module 210 according to the first embodiment.

The object management module 210 receives an initialization instruction from the object management module 210 (Step S1101). The initialization instruction includes the size of a memory area allocated to the database 230 and the address of the memory area.

The object management module 210 divides the memory area allocated to the database 230 into memory areas of a predetermined size (memory block size), adds the memory areas to the free block list 250 (Step S1102), and ends the processing.

Specifically, the object management module 210 divides the memory area allocated to the database 230 into the plurality of memory blocks 600, and generates the same number of entries 700 as that of the memory blocks 600 in the free block list 250. The object management module 210 sets the list pointer 701 of one entry 700 to the address of another entry 700, and also sets the memory block pointer 702 to the address of one memory block 600.

In this embodiment, the database management module 200 and the object management module 210 are separately configured, but the database management module 200 and the object management module 210 may be configured as one functional module. For example, the database management module 200 may include the function of the object management module 210.

As described above, the computer 100 writes data of a record relevant to transaction processing into the main memory (non-volatile memory 122) among the data stored in the cache memory of the processor 110 at the time of commit in transaction processing. As a result, the state of data stored in the cache memory and the state of data stored in the main memory match with each other. In other words, the consistency of data can be ensured.

Further, the computer 100 updates the control data 410 at the time of operation of the record 430, to thereby ensure the consistency of data while maintaining persistency of the data. As a result, the transaction can be rolled back without using a memory area dedicated for logging. Therefore, it is possible to use the memory area of the non-volatile storage medium effectively.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer for executing database processing, the computer comprising:
    a processor including a cache memory; and
    a non-volatile memory coupled to the processor, the non-volatile memory having a database constructed thereon,
    wherein the processor is programmed to implement:
    a database management module configured to execute transaction processing on the database using the cache memory and assign a flag indicating a processing state to data to be processed in the transaction processing on the database; and
    a write processing module configured to write data stored in the cache memory into the database,
    wherein the database management module is configured to record an identifier and a data size of the data that is operated on in the transaction processing in a buffer,
    wherein the database management module is configured to:
    in a case of receiving a commit request for the transaction processing on the database, output a start instruction including the identifier of the data and the data size of the data, which are recorded in the buffer, to the write processing module, and
    wherein the write processing module is configured to:
    in a case of receiving the start instruction, identify the data that is operated on in the transaction processing based on the identifier of the data and the data size of the data from among data stored in the cache memory;
    prohibit writing of data into a memory area storing the identified data;
    write the identified data that is operated on in the transaction processing into the database; and
    after completion of the writing of the identified data into the database, resume writing of data into the memory area storing the identified data and output a notification to the database management module,
    wherein the database management module is configured to:
    receive, from the write processing module, a completion notification notifying that the data stored in the cache memory is written into the database; and
    reflect processing specifics of the database in the transaction processing based on the flag, and
    wherein the database management module is configured to:
    in a case of being requested to execute rollback processing due to an occurrence of a failure in the transaction processing, rollback the database to a state before the transaction processing is executed based on the flag.

2. The computer according to claim 1, wherein the database management module is configured to:
    in a case where first data stored in the database is updated, generate updated first data and add to the database the updated first data assigned with a first flag indicating that the updated first data is updated data;
    assign to the first data a second flag indicating that the first data is data before update;
    in the case of receiving the completion notification from the write processing module, delete the first flag from the updated first data assigned with the first flag and the first data assigned with the second flag from the database; and
    in the case of being requested to execute the rollback processing, delete the second flag from the first data assigned with the second flag and the updated first data assigned with the first flag from the database.

3. The computer according to claim 1, wherein the database management module is configured to:
    in a case where second data stored in the database is deleted, assign, to the second data, a third flag indicating that the second data is data to be deleted;
    in the case of receiving the completion notification from the write processing module, delete the second data assigned with the third flag from the database; and
    in the case of being requested to execute the rollback processing, delete the third flag from the second data assigned with the third flag.

4. The computer according to claim 1, wherein the database management module is configured to:
    in a case where third data is added to the database, add, to the database, the third data assigned with a fourth flag indicating that the third data is data to be added;

in the case of receiving the completion notification from the write processing module, delete the fourth flag from the third data assigned with the fourth flag in a case of receiving the completion notification from the write processing module; and in the case of being requested to execute the rollback processing, delete the third data assigned with the fourth flag from the database.

5. A data management method, which is executed by a computer for executing database processing, the computer including:

a processor including a cache memory; and a non-volatile memory coupled to the processor, the non-volatile memory having the database constructed thereon, the processor implementing a database management module and a write processing module, the data management method comprising:

a step of executing, by the database management module, transaction processing on the database using the cache memory using the cache memory, including recording an identifier and a data size of data that is operated in the transaction processing in a buffer and assigning a flag indicating a processing state to data to be processed in the transaction processing;

a step of outputting, by the database management module, a start instruction of processing to the write processing module in a case of receiving a commit request for the transaction processing, the start instruction including the identifier of the data and the data size of the data, which are recorded in the buffer;

a step of writing, by the write processing module, the data that is operated on in the transaction processing into the database among data stored in the cache memory in a case of receiving the start instruction of processing, wherein the step of writing includes:

identifying the data that is operated on in the transaction processing based on the identifier of the data and the data size of the data, prohibiting writing of data into a memory area storing the identified data;

writing the identified data into the database, and resuming writing of data into the memory area storing the identified data after completion of the writing of the identified data, and outputting a completion notification to the database management module;

a step of receiving, by the database management module, from the write processing module, the completion notification notifying that the data stored in the cache memory is written into the database;

a step of reflecting, by the database management module, processing specifics of the database in the transaction processing based on the flag; and a step of rolling back, by the database management module, the database to a state before the transaction processing is executed based on the flag in a case of being requested to execute rollback processing due to an occurrence of a failure in the transaction processing.

6. The data management method according to claim 5, wherein the step of assigning the flag includes:

generating a piece of updated first data in a case where a piece of first data stored in the database is updated, and adding to the database the piece of updated first data assigned with a first flag indicating that the piece of updated first data is updated data, and assigning to the piece of first data a second flag indicating that the piece of first data is data before update, and wherein the step of reflecting includes:

deleting the first flag from the updated data assigned with the first flag; and deleting the first data assigned with the second flag from the database, and wherein the step of rolling back includes:

deleting the second flag from the first data assigned with the second flag; and deleting the updated first data assigned with the first flag from the database.

7. The data management method according to claim 5, wherein the step of assigning the flag includes assigning, in a case where second data stored in the database is deleted, to the second data a third flag indicating that the second data is data to be deleted, wherein the step of reflecting includes deleting the second data assigned with the third flag from the database, and wherein the step of rolling back includes deleting the third flag from the second data assigned with the third flag.

8. The data management method according to claim 5, wherein the step of assigning the flag includes adding to the database third data assigned with a fourth flag indicating that the third data is data to be added, wherein the step of reflecting includes deleting the fourth flag from the third data assigned with the fourth flag, and wherein the step of rolling back includes deleting, the third data assigned with the fourth flag from the database in the case of being requested execution of the rollback processing.

* * * * *